(12) United States Patent
Nakagawa

(10) Patent No.: US 10,171,342 B2
(45) Date of Patent: Jan. 1, 2019

(54) RECORDING MEDIUM AND PACKET RELAY METHOD FOR RELAYING A PACKET IN A FIRST SUB-DOMAIN AMONG A PLURALITY OF SUB-DOMAINS IN A SERVICE CHAIN CONFIGURED ACROSS THE PLURALITY OF SUB-DOMAINS

(71) Applicant: FUJITSU LIMITED, Kawasaki-shi, Kanagawa (JP)

(72) Inventor: Yukihiro Nakagawa, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 8 days.

(21) Appl. No.: 15/410,817

(22) Filed: Jan. 20, 2017

(65) Prior Publication Data

US 2017/0237648 A1    Aug. 17, 2017

(30) Foreign Application Priority Data

Feb. 15, 2016    (JP) ................................ 2016-026411

(51) Int. Cl.
*H04L 12/715*    (2013.01)
*H04L 12/741*    (2013.01)
*H04L 12/725*    (2013.01)

(52) U.S. Cl.
CPC ............ *H04L 45/04* (2013.01); *H04L 45/306* (2013.01); *H04L 45/74* (2013.01)

(58) Field of Classification Search
None
See application file for complete search history.

(56) References Cited

U.S. PATENT DOCUMENTS

2016/0014016 A1    1/2016 Guichard et al.
2017/0005920 A1*   1/2017 Previdi ................. H04L 45/306

FOREIGN PATENT DOCUMENTS

JP    2015-154325    8/2015
JP    2015-154421    8/2015
WO   2015-118874    8/2015

OTHER PUBLICATIONS

Extended European Search Report dated Sep. 22, 2017 for corresponding European Patent Application No. 17153020.7, 9 pages.
(Continued)

*Primary Examiner* — Anh Ngoc M Nguyen
(74) *Attorney, Agent, or Firm* — Fujitsu Patent Center

(57) ABSTRACT

A non-transitory storage medium having stored therein a packet relay program for relaying a packet in a first sub-domain among a plurality of sub-domains in a service chain configured across the plurality of sub-domains is provided. The packet relay program causes a computer in the first sub-domain to perform a process. The process includes specifying a transmission destination on a basis of relay information with which identification information indicating a combination of a plurality of service functions included in the service chain, an index indicating an order for applying the service function, and the transmission destination are associated, changing the index included in the packet into a predetermined value when the specified transmission destination is a second sub-domain among the plurality of sub-domains, and transmitting the packet including the identification information included in the packet and the index of the predetermined value to the specified transmission destination.

4 Claims, 32 Drawing Sheets

(56) References Cited

OTHER PUBLICATIONS

Extended European Search Report dated Jun. 26, 2017 for corresponding European Patent Application No. 17153020.7, 8 pages.
Dolson, David et al, "Hierarchical Service Function Chaining", Internet Engineering Task Force, IETF, Dec. 14, 2015, pp. 1-17, XP015110235.
Homma, S. et al., "Analysis on Forwarding Methods for Service Chaining", Internet Engineering Task Force, IETF, Jan. 29, 2016, pp. 1-39, XP015110889.
Homma, S. et al., "Analysis on Forwarding Methods for Service Chaining", Internet Engineering Task Force, IETF, Oct. 9, 2015, pp. 1-34, XP015108837.

* cited by examiner

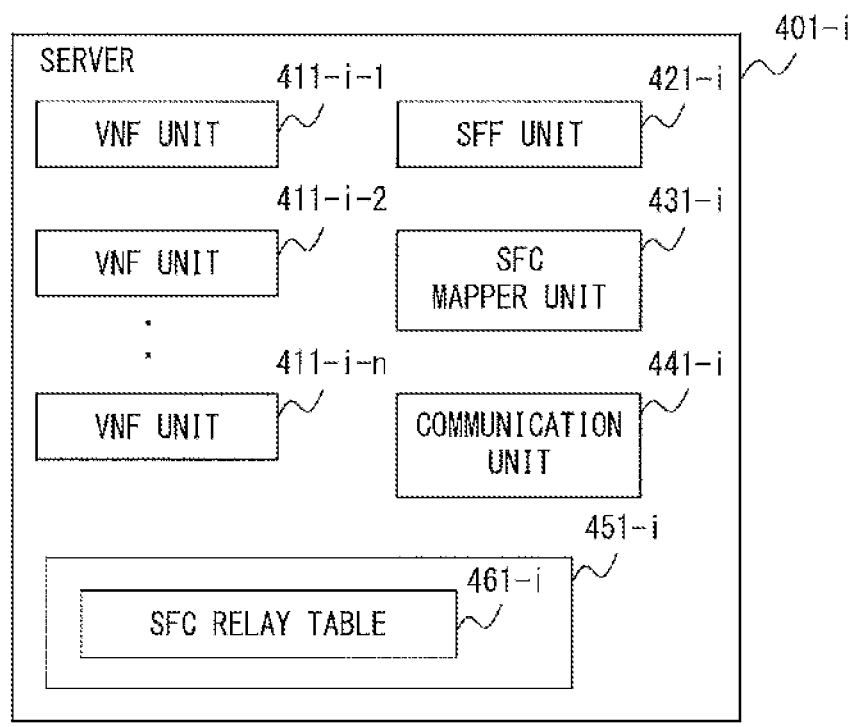
F I G. 4

| Service Path Id | Service Index | Output |
|---|---|---|
| 100 | 255 | VNF1-1 |
| 100 | 254 | VNF1-2 |
| ⋮ | ⋮ | ⋮ |
| 100 | 246 | VNF1-10 |
| 100 | 245 | Sub-domain B |

| Service Path Id | Service Index | Output |
|---|---|---|
| 100 | 255 | VNF2-1 |
| 100 | 254 | VNF2-2 |
| 100 | 253 | Server |

461-2

F I G. 5 B

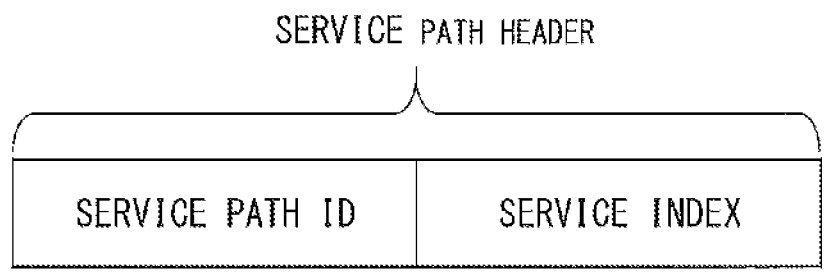
F I G. 6

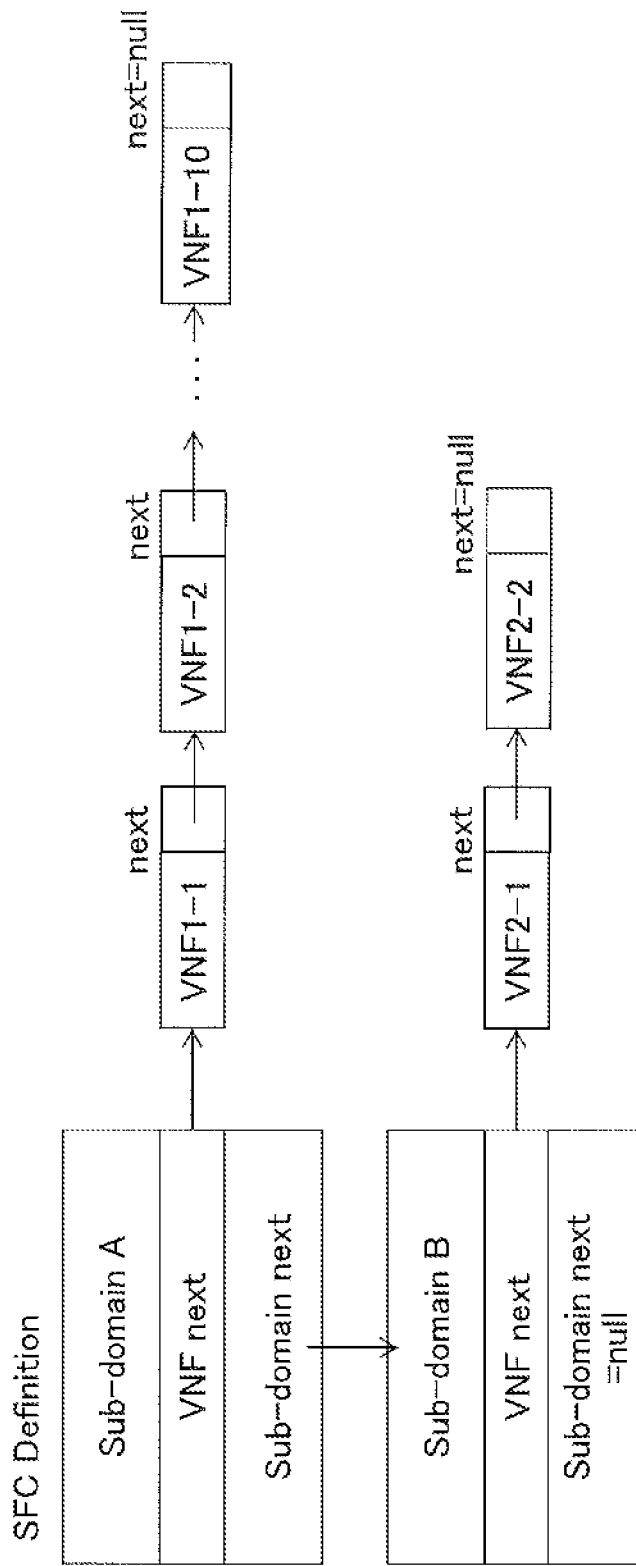
F I G. 9

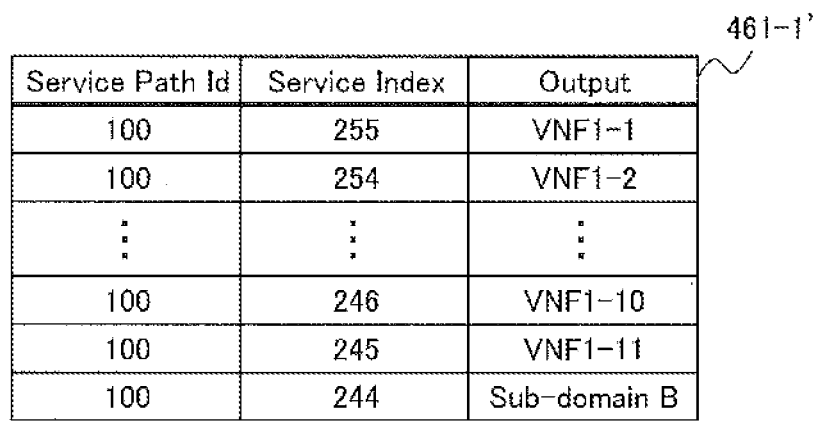
F I G. 1 4

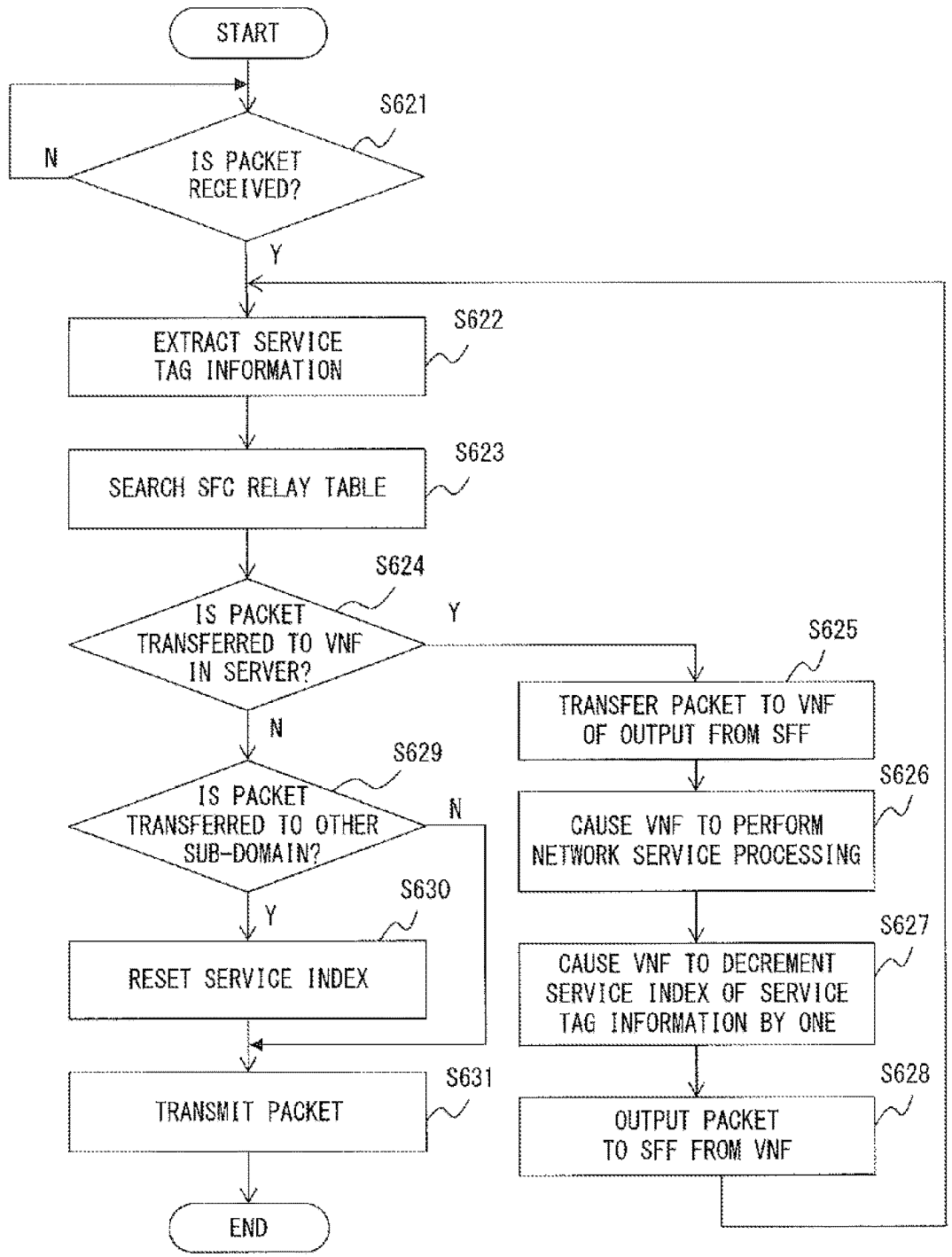
F I G. 1 5

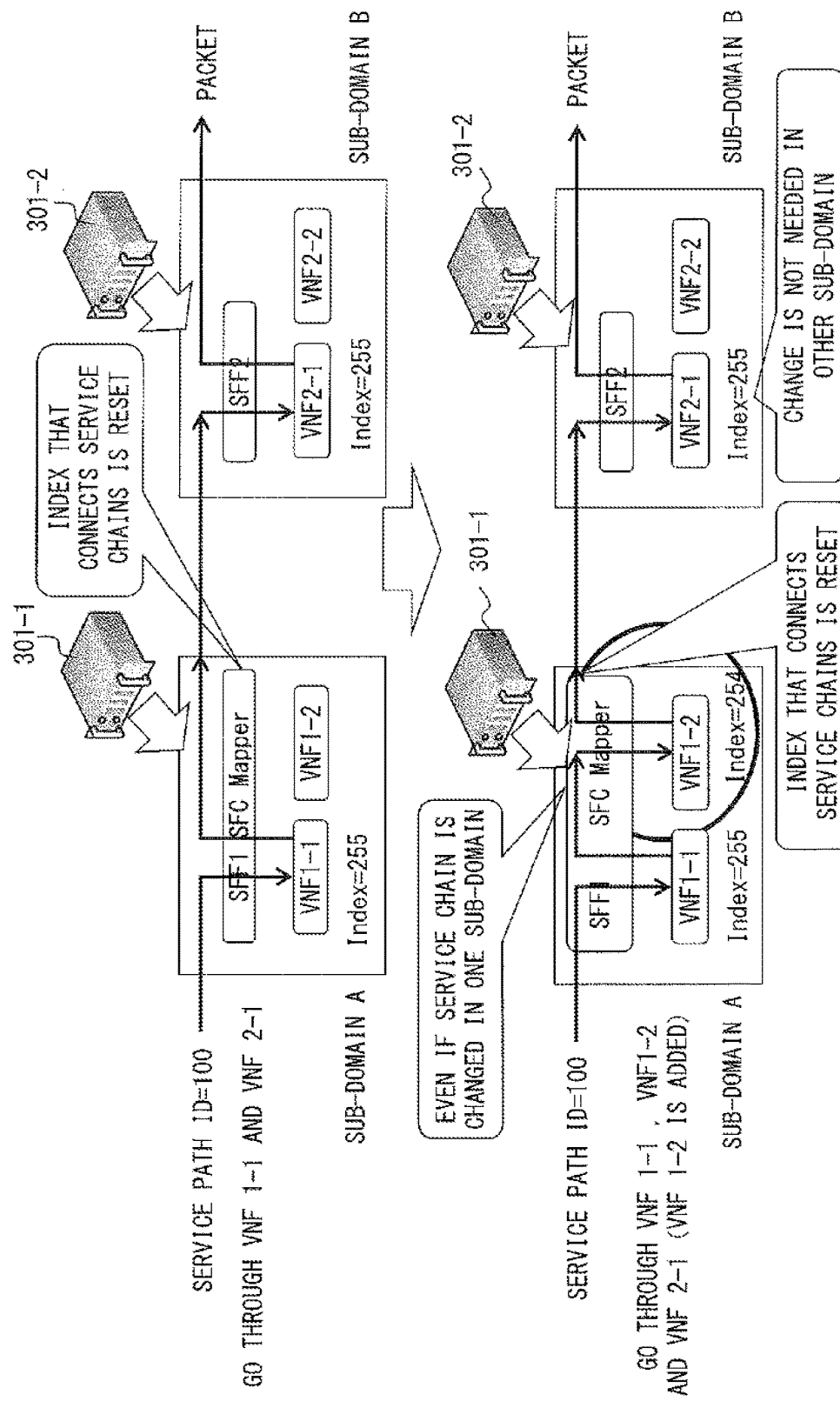
F I G. 16

| Service Path Id | Service Index | Output | Path Id |
|---|---|---|---|
| 100 | 255 | VNF1-1 | - |
| 100 | 254 | VNF1-2 | - |
| ⋮ | ⋮ | ⋮ | ⋮ |
| 100 | 246 | VNF1-10 | - |
| 100 | 245 | Sub-domain B | 200 |

2461-1

F I G. 2 2 A

| Service Path Id | Service Index | Output | Path Id |
|---|---|---|---|
| 200 | 255 | VNF2-1 | — |
| 200 | 254 | VNF2-2 | — |
| 200 | 253 | Server | — |

| Service Path Id | Service Index | Output |
|---|---|---|
| 100 | 255 | VNF1-1 |
| 100 | 254 | VNF1-2 |
| 100 | 245 | Sub-domain Group1 |

2461-1-B

| GROUP | Sub-domain | Path Id | CONDITIONS |
|---|---|---|---|
| 1 | B | 200 | LOAD IS EQUAL TO OR LESS THAN 50% |
| | C | 300 | OTHER THAN THE ABOVE |

FIG. 27

RECORDING MEDIUM AND PACKET RELAY METHOD FOR RELAYING A PACKET IN A FIRST SUB-DOMAIN AMONG A PLURALITY OF SUB-DOMAINS IN A SERVICE CHAIN CONFIGURED ACROSS THE PLURALITY OF SUB-DOMAINS

CROSS-REFERENCE TO RELATED APPLICATIONS

This application is based upon and claims the benefit of priority of the prior Japanese Patent Application No. 2016-026411, filed on Feb. 15, 2016, the entire contents of which are incorporated herein by reference.

FIELD

The embodiments discussed herein are related to a recording medium and a packet relay method.

BACKGROUND

Conventionally, dedicated hardware has been used for communication equipment such as a router, a gateway, etc. In recent years, a network functions virtualization (NFV) has been put to practical use by which a function (hereinafter, referred to as a network service function) relating to a network service of various pieces of communication equipment has been virtualized as software on a general-purpose server.

When a virtual network function is requested, a technique is known by which a device simultaneously arranges the virtual network function on a server and sets a path for a network that connects to an arrangement destination server (see, for example, International Publication Pamphlet No. WO2015-118874)

When a packet goes through a plurality of virtual network functions (VNF) of a virtualized network, the packet is subjected to predetermined processing using each VNF. Furthermore, a transfer path of the packet may be dynamically changed. The transfer path of the packet is referred to as a service chain.

Unfortunately, when the service chain is implemented across sub-domains, a service index indicating the VNFs of a plurality of sub-domains is affected along with a setting change in the service chain, and therefore resetting of the plurality of sub-domains is needed and an operational efficiency is reduced.

Furthermore, a hierarchical service chain is proposed in which a service chain (high-order) that connects sub-domains and a service chain (low-order) that exists in the sub-domain are defined, respectively, and the service chains are hierarchically configured.

In the hierarchical service chain, processing is performed in which a high-order service chain is converted into a low-order service chain at an entrance of the sub-domain and the low-order service chain is converted into the high-order service chain at an exit of the sub-domain. Therefore, there is a problem in which, in the hierarchical service chain, the processing of the service chain becomes complicated.

Furthermore, documents such as Japanese Laid-open Patent Publication Nos. 2015-154421, 2015-154325, etc. are well known.

SUMMARY

According to an aspect of the invention, A non-transitory storage medium having stored therein a packet relay program for relaying a packet in a first sub-domain among a plurality of sub-domains in a service chain configured across the plurality of sub-domains is provided. The packet relay program causes a computer in the first sub-domain to perform a process. The process includes specifying a transmission destination corresponding to identification information included in the packet and an index included in the packet on the basis of relay information with which identification information indicating a combination of a plurality of service functions included in the service chain, an index indicating an order for applying the service function, and the transmission destination are associated, changing the index included in the packet into a predetermined value when the specified transmission destination is a second sub-domain among the plurality of sub-domains, and transmitting a packet including the identification information included in the packet and the index of the predetermined value to the specified transmission destination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 4 is a configuration diagram of a server according to the first embodiment.

FIG. 5A illustrates an example of an SFC relay table according to the first embodiment.

FIG. 5B illustrates an example of the SFC relay table according to the first embodiment.

FIG. 6 illustrates a service path header.

FIG. 9 illustrates an example of service chain definition information.

FIG. 14 illustrates an example of the SFC relay table after the change.

FIG. 15 is a flowchart of packet relay processing of the server according to the first embodiment.

FIG. 16 illustrates the service index of the VNF before and after the change in the service chain according to the first embodiment.

FIG. 22A illustrates an example of an SFC relay table according to the second embodiment.

FIG. 22B illustrates an example of the SFC relay table according to the second embodiment.

FIG. 27 illustrates a modification of the SFC relay table according to the second embodiment.

DESCRIPTION OF EMBODIMENTS

Figure 1:
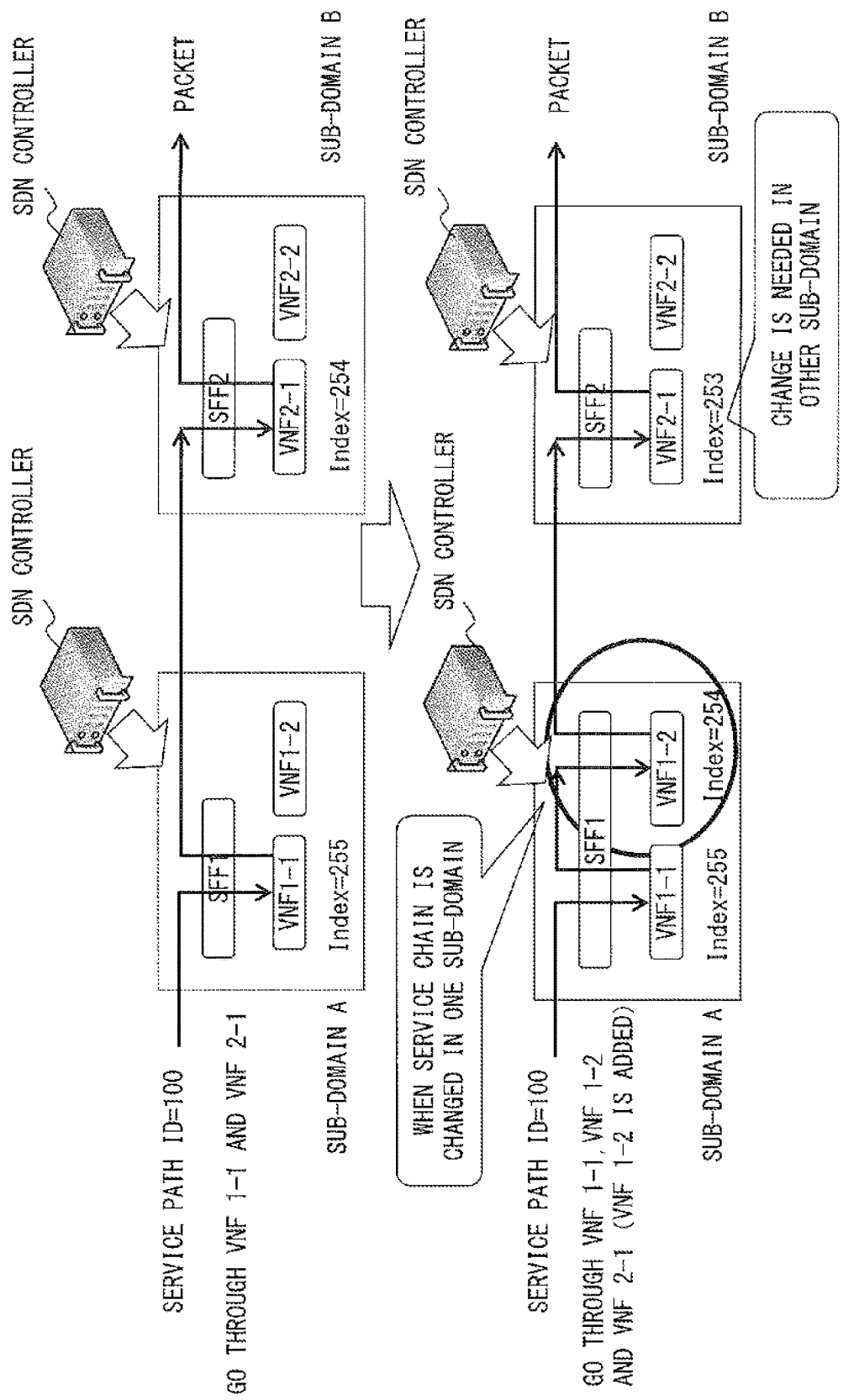
FIG. 1 illustrates a service index of a VNF before and after a change in a service chain.

FIG. 1 illustrates a service index of a VNF before and after a change in a service chain. In FIG. 1, with respect to two sub-domains A and B, a case is illustrated in which two software defined network (SDN) controllers set service function chaining (SFC) relay tables of respective sub-domains.

The upper side of FIG. 1 illustrates the service chain before a change, and the lower side of FIG. 1 illustrates the service chain after a change.

A service function forwarder (SFF) in each sub-domain refers to the service index among service tag information given to a packet and transfers the packet to the VNF corresponding to the service index. A correspondence relationship between the service index and the VNF is described in the SFC relay table held by each sub-domain.

Before the change in the service chain, the service chain includes a VNF 1-1 of the sub-domain A and a VNF 2-1 of the sub-domain B. The packet is processed using each VNF in the order of the VNF 1-1 and the VNF 2-1. Furthermore, in the SFC relay table of the sub-domain A, the service index corresponding to the VNF 1-1 is 255 and, in the SFC relay table of the sub-domain B, the service index corresponding to the VNF 2-1 is 254. Furthermore, an initial value of the service index of the packet is supposed to be 255. When the packet is received, the SFF in the sub-domain A transfers the packet to the VNF 1-1 because the service index of the packet is 255. When the packet is processed, the VNF 1-1 of the sub-domain A decrements the service index of the packet by one, namely, changes it to 254 and transmits the packet to the SFF. The SFF in the sub-domain A outputs the packet with the service index=254 to the sub-domain B. Because the service index of the received packet is 254, the SFF in the sub-domain B transfers the packet to the VNF 2-1.

As illustrated in FIG. 1 of the lower side, the VNF 1-2 of the sub-domain A is supposed to be added to the service chain. The packet is processed using each VNF in the order of the VNF 1-1, the VNF 1-2 and the VNF 2-1. Accompanied by the change in the service chain in the sub-domain A, the SDN controller in each sub-domain changes the SFC relay table of its own sub-domain. In the SFC relay table of the sub-domain A, the service index corresponding to the VNF 1-1 is 255 and the service index corresponding to the VNF 1-2 changes to 254. Furthermore, in the SFC relay table of the sub-domain B, the service index corresponding to the VNF 2-1 changes to 253.

As described above, when the service chain in the sub-domain A is changed, the SFC relay table of the sub-domain B is also changed.

Figure 2:
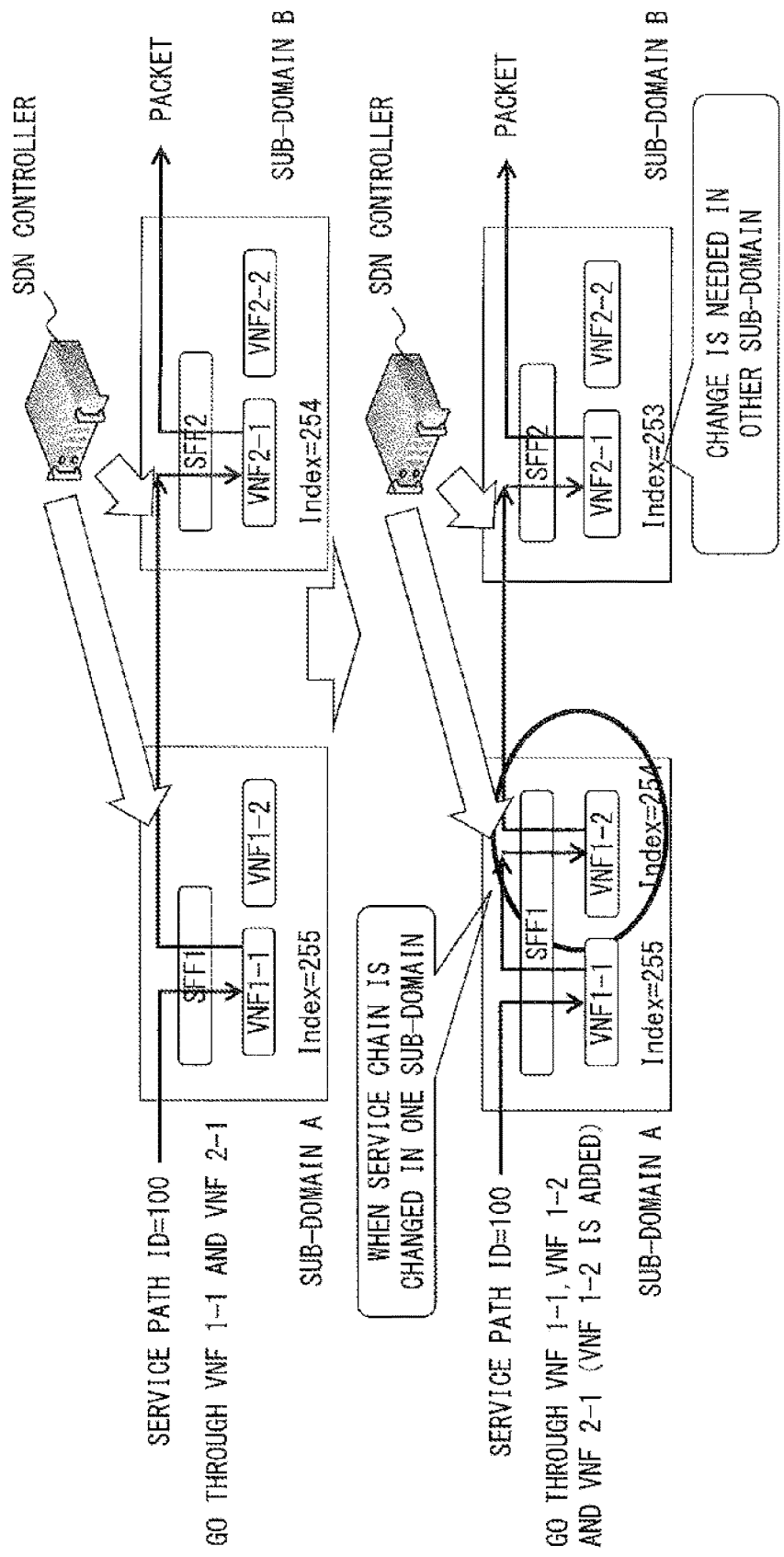
FIG. 2 illustrates the service index of the VNF before and after a change in the service chain.

FIG. 2 illustrates the service index of the VNF before and after the change in the service chain. In FIG. 2, with respect to two sub-domains A and B, a case is illustrated in which one SDN controller sets the SFC relay table of each sub-domain.

The upper side of FIG. 2 illustrates the service chain before the change, and the lower side of FIG. 2 illustrates the service chain after the change.

Descriptions of the processing of the SFF and those of the service index corresponding to the VNF are the same as those of FIG. 1. As illustrated at the lower side of FIG. 2, the VNF 1-2 of the sub-domain A is supposed to be added to the service chain, in the same manner as in FIG. 1. The packet is processed using each VNF in the order of the VNF 1-1, the VNF 1-2, and the VNF 2-1. Accompanied by the change in the service chain in the sub-domain A, the SDN controller changes the SFC relay table of each sub-domain. In the SFC relay table of the sub-domain A, the service index corresponding to the VNF 1-1 is 255 and the service index corresponding to the VNF 1-2 changes to 254. Furthermore, in the SFC relay table of the sub-domain B, the service index corresponding to the VNF 2-1 changes to 253.

As described above, also in FIG. 2, when the service chain in the sub-domain A is changed, the SFC relay table of the sub-domain B is also changed.

Embodiments will be described below with reference to the accompanying drawings.

Figure 3:
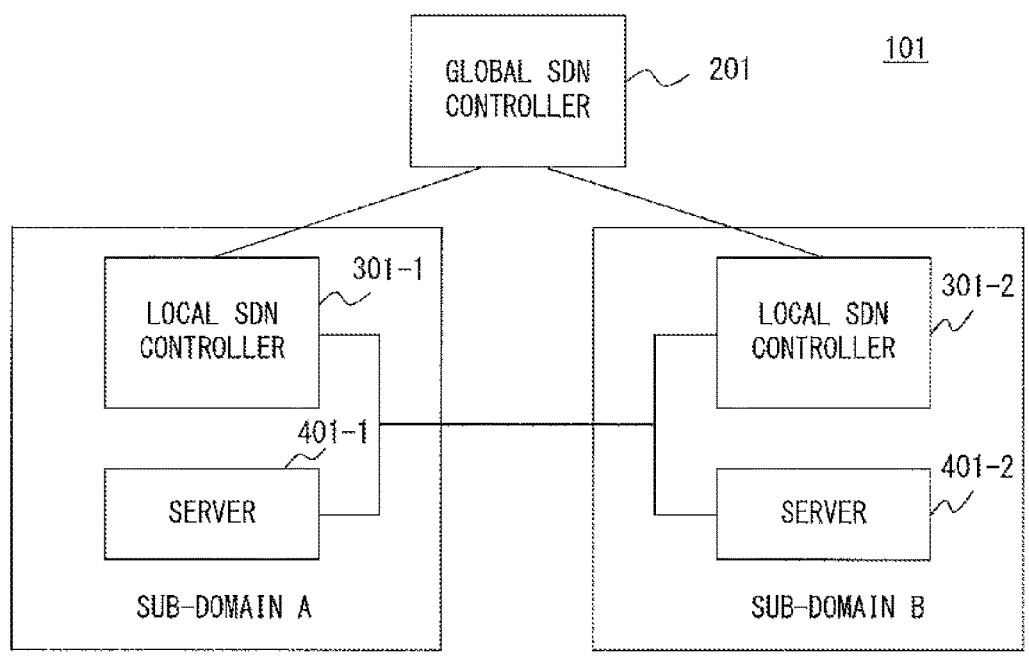
FIG. 3 is a configuration view of a system according to a first embodiment.

FIG. 3 is a configuration view of a system according to a first embodiment.

The system 101 includes a global software defined network (SDN) controller 201, local SDN controllers 301-*i* (i=1, 2) and servers 401-*i* (i=1, 2).

The global SDN controller 201 is connected to the local SDN controllers 301-*i* via a network. Furthermore, the local SDN controllers 301-*i* and the servers 401-*i* are connected to each other, respectively, via a network.

The local SDN controller 301-1 and the server 401-1 belong to the sub-domain A. The local SDN controller 301-2 and the server 401-2 belong to the sub-domain B. The sub-domain is a group of devices determined by a manager.

The number of the servers 401-*i* illustrated in FIG. 3 is expressed as one example and is not limited thereto.

The global SDN controller 201 requests the local SDN controllers 301-*i* to set the service chains.

The local SDN controllers 301-*i* set the service chains. Specifically, the local SDN controllers 301-*i* set the SFC relay tables of the servers 401-*i* in the sub-domains to which the local SDN controllers 301-*i* belong.

The servers 401-*i* execute service functions of the network using software. Thereby, the service functions (hereinafter, simply referred to as a service function) of the network are visualized on the servers 401-*i*. Examples of the service function include a firewall, a router, a deep packet inspection (DPI), WAN acceleration, a service quality monitor, and the like.

FIG. 4 is a configuration diagram of the server according to the first embodiment.

The server 401-*i* includes VNF units 411-*i-j* (j=1 to n), a service function forwarder (SFF) unit 421-*i*, an SFC mapper unit 431-*i*, a communication unit 441-*i*, and a memory unit 451-*i*.

The VNF units 411-*i-j* execute the service functions of the network to the packet. Hereinafter, the VNF units 411-*i-j* may be described as the VNFs i-j.

The SFF unit 421-*i* transfers the packet to the appropriate service functions (the VNF units 411-*i-j*) on the basis of service tag information included in the packet and a SFC relay table 461-*i*.

The SFC mapper unit 431-*i* updates the service tag information at the time of outputting the packet to the other sub-domain.

The communication unit 441-*i* communicates with the local SDN controller 301-*i* or the other server 401-*i*.

The memory unit 451-*i* is a memory device that stores data for use in the server 401-*i*. The memory unit 451-*i* stores the SFC relay table 461-*i*. The SFC relay table 461-*i* indicates the service chain (a combination of the VNF units 411-*i-j* applied to the packet) in the sub-domain to which the server 401-*i* belongs and indicates an output of the packet in the service chain.

FIGS. 5A and 5B illustrate examples of the SFC relay tables according to the first embodiment.

The SFC relay table 461-1 illustrated in FIG. 5A is stored in the server 401-1 in the sub-domain A and the SFC relay table 461-2 illustrated in FIG. 5B is stored in the server 401-2 in the sub-domain B.

The service path ID, the service index, and the output are associated with each other and are described in the SFC relay table 461-*i*.

The service path ID is information for identifying the service chain. The service path ID indicates a combination of the service functions performed with respect to the packet.

The service index is information indicating the service function and is information indicating the service function next applied to the packet. The service index indicates an order for performing the service function. Also, the service index indicates the service function, the sub-domain, or the device of the next output of the packet. In the first embodiment, the initial value of the service index is 255 and the service index that is decremented by one in the order of the VNFs to be transferred is allocated to the VNF of each sub-domain.

Figure 10:
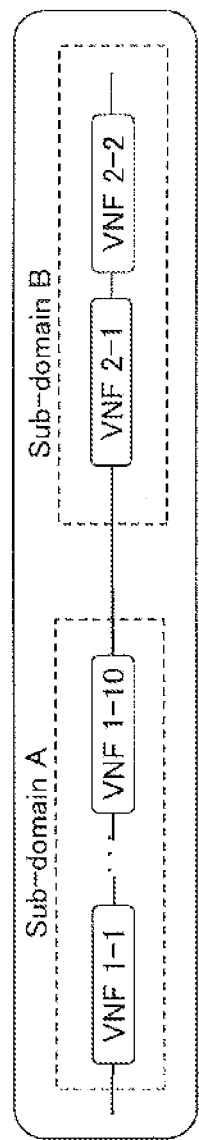
FIG. 10 illustrates an example of the service chain.

Consider here that the service chain is configured across the sub-domain A and the sub-domain B to be hereinafter described as illustrated in FIG. 10. In the service chain, the VNFs 1-1 to 1-10 are included in the sub-domain A and the VNFs 2-1 to 2-2 are included in the sub-domain B.

Furthermore, in the sub-domain A, the packet is transferred and various processes are performed in the order of the VNF 1-1, the VNF 1-2, . . . , and the VNF 1-10. After the packet is processed using the VNF 1-10, the packet is transmitted to the sub-domain B. Furthermore, in the sub-domain B, the packet is transferred and the various processes are performed in the order of the VNF 2-1 and the VNF 2-2.

When the above-described service chain exists, the SFC relay table 461-1 of the server 401-1 in the sub-domain A is set to values as illustrated in FIG. 5A, and the SFC relay table 461-2 of the server 401-2 in the sub-domain B is set to values as illustrated in FIG. 5B.

In the sub-domain A, the packet is transferred and the various processes are performed in the order of the VNF 1-1, the VNF 1-2, . . . , and the VNF 1-10. Accordingly, as in the SFC relay table 461-1 illustrated in FIG. 5A, the service index is 255 corresponding to the VNF 1-1 that is an output to which the packet is first transferred in the sub-domain A, and the service index is 254 corresponding to the VNF 1-2 that is an output to which the packet is next transferred.

Furthermore, in the sub-domain B, the packet is transferred and the various processes are performed in the order of the VNF 2-1 and the VNF 2-2. Accordingly, as in the SFC relay table 461-2 illustrated in FIG. 5B, the service index is 255 corresponding to the VNF 2-1 that is an output to which the packet is first transferred in the sub-domain B, and the service index is 254 corresponding to the VNF 2-2 that is an output to which the packet is next transferred.

Furthermore, the service path ID of each entry in the SFC relay table 461-1 is 100 and the service path ID of each entry in the SFC relay table 461-2 is 100; therefore, the service path ID is expressed as the same value. Therefore, it is understood that the service chain in the sub-domain A indicated in the SFC relay table 461-1 is connected to the service chain in the sub-domain B indicated in the SFC relay table 461-2. Furthermore, the service chain is configured across the sub-domain A and the sub-domain B as illustrated in FIG. 10.

The output indicates an output destination of the packet. In the output, the service function (VNF), the sub-domain, or the device is described.

When the packet is received, the SFF unit 421-*i* refers to the SFC relay table 461-*i*, detects the service path ID included in the packet and the output corresponding to the service index, and outputs the packet to the detected output.

Suppose, for example, that when the SFF unit 421-1 receives the packet, the service path ID included in the received packet is 100 and the service index included in the received packet is 255. In this case, referring to the SFC relay table 461-1, the output corresponding to the service path ID=100 and the service index=255 is the VNF 1-1. Therefore, the SFF unit 421-1 outputs the received packet to the VNF 1-1.

Suppose, furthermore, that when the SFF unit 421-1 receives the packet, the service path ID included in the received packet is 100 and the service index included in the received packet is 245. In this case, referring to the SFC relay table 461-1, the output corresponding to the service path ID=100 and the service index=245 is the sub-domain B. Therefore, the SFF unit 421-1 transfers the packet to the SFC mapper unit 431-1 and the SFC mapper unit 431-1 outputs the packet to the sub-domain B. At this time, the SFC mapper unit 431-1 resets the service index of the packet, namely, updates the service index to 255.

Suppose, furthermore, that when the SFF unit 421-2 receives the packet, the service path ID included in the received packet is 100 and the service index included in the received packet is 255. In this case, referring to the SFC relay table 461-2, the output corresponding to the service path ID=100 and the service index=255 is the VNF 2-1. Therefore, the SFF unit 421-2 outputs the received packet to the VNF 2-1.

FIG. 6 illustrates a service path header.

In the service chaining, the service tag information is given to the packet and the SFF unit 421-*i* transfers the packet to the appropriate service function with reference to the service tag information. The service tag information is given by a classifier arranged at the entrance of the service chain.

The service tag information given to the packet includes the service path header. The service path header includes the service path ID and the service index.

The service path ID is information for identifying the service chain. The service path ID indicates a combination of the service functions to be performed on the packet.

The service index is information indicating the number of the service functions to be performed on the packet and is information indicating the service function to be next applied to the packet. For example, an initial value of the service index is 255 and the service index is decremented by one whenever the service index is processed using the VNF units 411-$i$-$j$. Therefore, it can be determined by the service index that how many the service functions are performed with respect to the packet, and the service function of the next transfer destination is understood. For example, when the service index of the packet is 254, it is indicated that the service index is processed using one service function. Referring to the SFC relay table 461-1 of FIG. 5A, it is understood that the packet is next transferred to the VNF 1-2.

Figure 7:
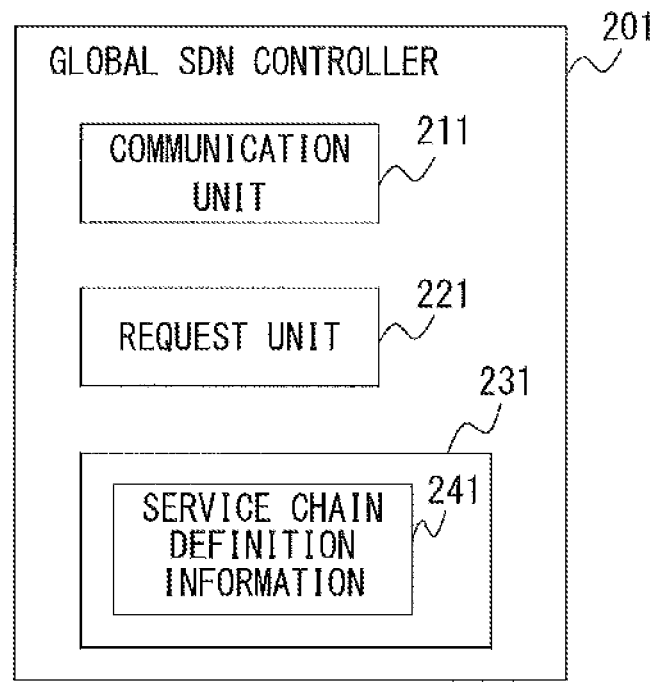
FIG. 7 is a configuration diagram of a global SDN controller according to the first embodiment.

FIG. 7 is a configuration diagram of the global SDN controller according to the first embodiment.

The global SDN controller 201 includes a communication unit 211, a request unit 221, and a memory unit 231.

The communication unit 211 transmits and receives data to and from the local SDN controller 301-$i$.

The request unit 221 requests the local SDN controller 301-$i$ to set the SFC relay table 461-$i$.

The memory unit 231 is a memory device that stores data for use in the global SDN controller 201. The memory unit 231 stores service chain definition information 241. The service chain definition information 241 is information for defining the service chain. The service chain definition information 241 includes information such as the service function included in the service chain, an order for applying the service function, the sub-domain to which the service function belongs, etc.

Figure 8:
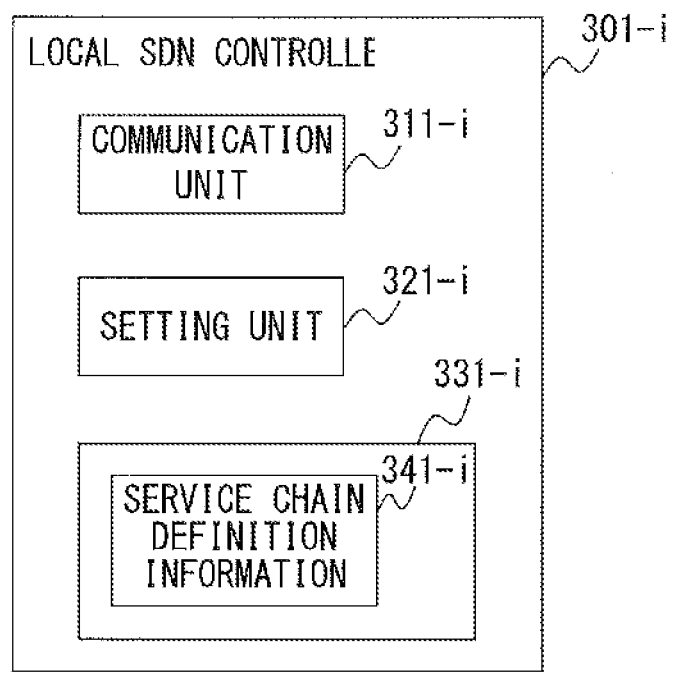
FIG. 8 is a configuration diagram of a local SDN controller according to the first embodiment.

FIG. 8 is a configuration diagram of the local SDN controller according to the first embodiment.

The local SDN controller 301-$i$ includes a communication unit 311-$i$, a setting unit 321-$i$, and a memory unit 331-$i$.

The communication unit 311-$i$ communicates with the global SDN controller 201 and the server 401-$i$.

The setting unit 321-$i$ sets the SFC relay table 461-$i$ of the server 401-$i$.

The memory unit 331-$i$ is a memory device that stores data for use in the local SDN controller 301-$i$. The memory unit 331-$i$ stores service chain definition information 341-$i$. The service chain definition information 341-$i$ is information for defining the service chain. The service chain definition information 341-$i$ includes information such as the service function included in the service chain, an order for applying the service function, the sub-domain to which the service function belongs, etc.

FIG. 9 illustrates an example of the service chain definition information.

FIG. 10 illustrates an example of the service chain.

The service chain definition information 241 and 341-$i$ is expressed as, for example, a linked list form as illustrated in FIG. 9. The configuration of the service chain illustrated in FIG. 10 corresponds to the service chain definition information illustrated in FIG. 9.

In the service chain definition information illustrated in FIG. 9, the VNF 1-1 to the VNF 1-10 are included in the sub-domain A, and the VNF 2-1 and the VNF 2-2 are included in the sub-domain B.

Furthermore, in the sub-domain A, the packet is transferred and the various processes are performed in the order of the VNF 1-1, the VNF 1-2, . . . , and the VNF 1-10. After the packet is processed using the VNF 1-10, the packet is transmitted to the sub-domain B.

Furthermore, in the sub-domain B, the packet is transferred and the various processes are performed in the order of the VNF 2-1 and the VNF 2-2.

When the service chain definition information of FIG. 9 is illustrated, the service chain is configured across the sub-domain A and the sub-domain B as illustrated in FIG. 10; specifically, the service chain is configured including the VNFs of the sub-domain A and the VNFs of the sub-domain B.

Figure 11:
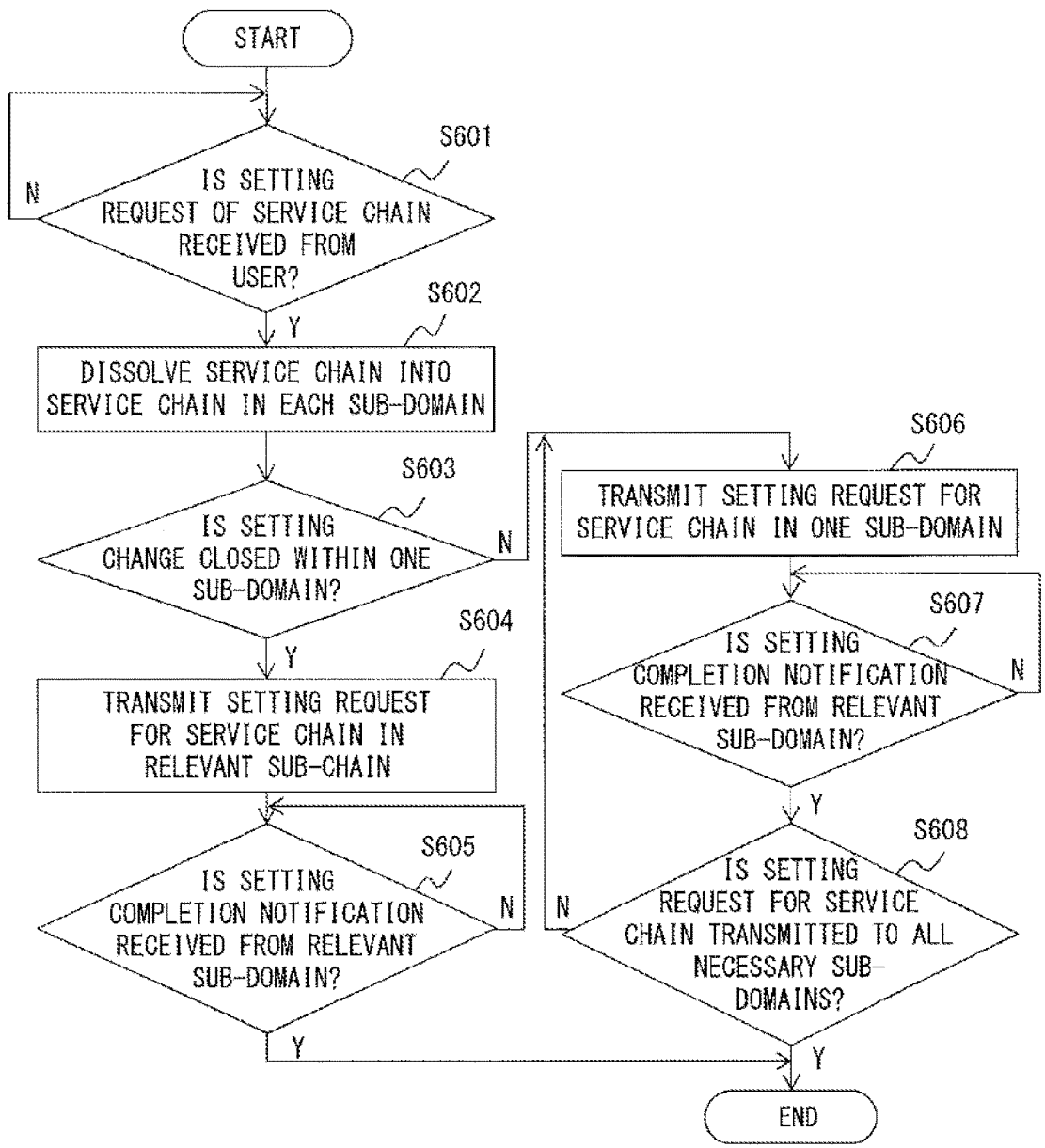
FIG. 11 is a flowchart of service chain setting request processing of the global SDN controller according to the first embodiment.

FIG. 11 is a flowchart of service chain setting request processing of the global SDN controller according to the first embodiment.

In step S601, if the request unit 221 receives a setting request of the service chain from a graphical user interface (GUI) etc. of the global SDN controller, the process proceeds to step S602. The service chain definition information is included in the setting request of the service chain.

In step S602, the request unit 221 dissolves the service chain into the service chain in each sub-domain on the basis of the received service chain definition information. In the case of the service chain definition information illustrated in FIG. 9, the service chain is dissolved into the service chain (the VNF 1-1, the VNF 1-2, . . . , and the VNF 1-10) in the sub-domain A and the service chain (the VNF 2-1 and the VNF 2-2) in the sub-domain B.

In step S603, the request unit 221 determines whether the setting change is closed within one sub-domain. Specifically, the request unit 221 compares the service chain definition information received this time and the current service chain definition information, and determines whether a changed portion exists only in the one sub-domain. If the setting change is closed within the one sub-domain, the process proceeds to step S604, and if the setting change is not closed within the one sub-domain, the process proceeds to step S606.

In step S604, the request unit 221 transmits the setting request for the service chain to the local SDN controller 301-$i$ in the sub-domain in which the service chain is changed. In the setting request for the service chain, the received service chain definition information is included.

In step S605, when the request unit 221 receives a setting completion notification of the service chain from the local SDN controller 301-$i$, the process ends.

In step S606, the request unit 221 transmits the setting request for the service chain to the SDN controller 301-$i$ of one sub-domain within the sub-domain to which the setting request for the service chain has not yet been transmitted and in which the service chain has been changed.

In step S607, if the request unit 221 receives the setting completion notification of the service chain from the local SDN controller 301-$i$, the process proceeds to step S608.

In step S608, if the setting request for the service chain is transmitted to all the sub-domains in which the service chain is changed, the process ends. If the setting request for the service chain is not transmitted to all the sub-domains in which the service chain is changed, the process returns to step S606.

Figure 12:
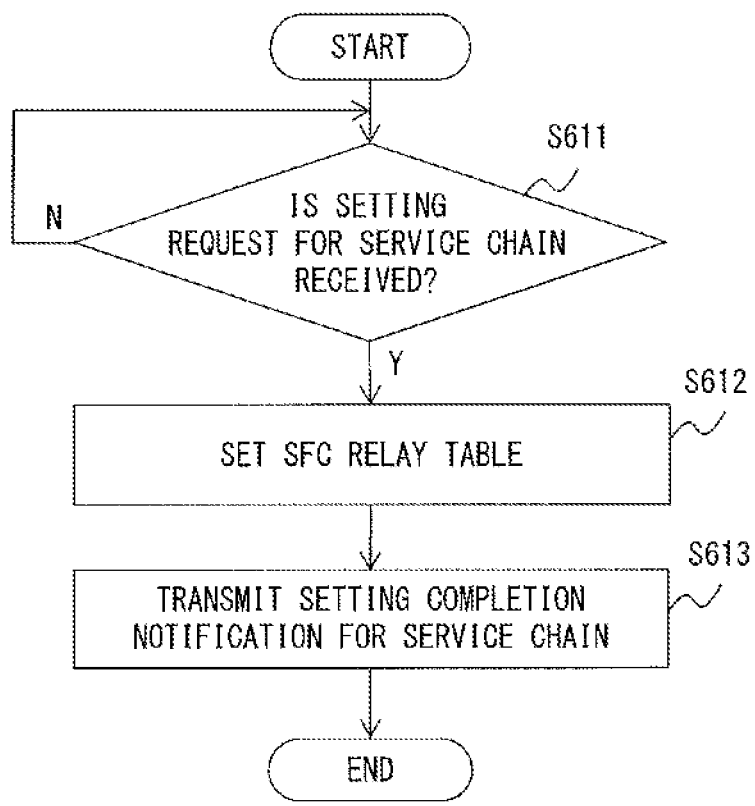
FIG. 12 is a flowchart of service chain setting processing of the local SDN controller according to the first embodiment.

FIG. 12 is a flowchart of service chain setting processing of the local SDN controller according to the first embodiment.

In step S611, if the communication unit 311-*i* receives the setting request for the service chain from the global SDN controller 201, the process proceeds to step S612.

In step S612, the setting unit 321-*i* sets the SFC relay table 461-*i* on the basis of the service chain definition information included in the setting request for the service chain.

In step S613, the setting unit 321-*i* transmits the setting completion notification of the service chain to the global SDN controller 201.

Herein, an example of a change in the SFC relay table accompanied by the change in the service chain will be described.

Figure 13:
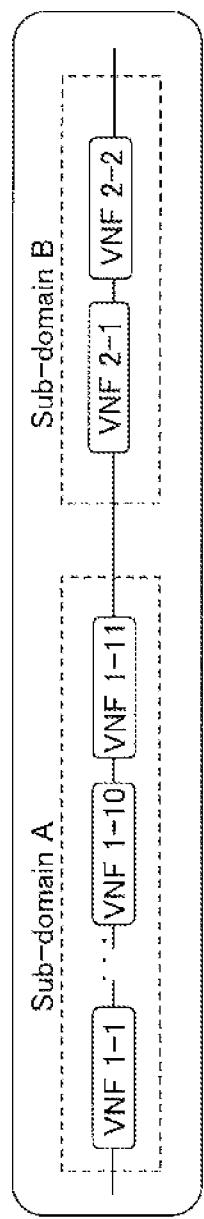
FIG. 13 illustrates an example of the service chain.

FIG. 13 illustrates an example of the service chain.

FIG. 14 illustrates an example of the SFC relay table after the change.

For example, the service chain is supposed to be changed into a state as illustrated from FIG. 10 to FIG. 13. Specifically, the VNF 1-11 is supposed to be added to the service chain in the sub-domain A. In the service chain illustrated in FIG. 10, the SFC relay table 461-1 of the server 401-1 is a state illustrated in FIG. 5A.

When the VNF 1-11 is added to the service chain in the sub-domain A, the SFC relay table 461-1 is changed into an SFC relay table 461-1' illustrated in FIG. 14 using the local SDN controller 301-1. Specifically, an entry of the service path ID=100, the service index=245, and the output=the VNF 1-11 is added to the SFC relay table 461-1'. Furthermore, the service index of the output=the sub-domain B is changed from 245 to 244.

In FIG. 13, the service chain in the sub-domain B is not changed. Therefore, the SFC relay table 461-2 of the server 401-2 in the sub-domain B is not changed and a state illustrated in FIG. 5B still remains.

FIG. 15 is a flowchart of the packet relay processing of the server according to the first embodiment.

In step S621, the communication unit 441-*i* receives the packet.

In step S622, the SFF unit 421-*i* extracts the service tag information of the packet. Specifically, the SFF unit 421-*i* extracts the service path ID and service index of the packet.

In step S623, the SFF unit 421-*i* searches the SFC relay table 461-*i* using as a search key the service path ID and service index of the packet, and specifies the next output of the corresponding packet.

In step S624, on the basis of search results, the SFF unit 421-*i* determines whether the next output of the packet is the VNF unit 411-*i-j* in the same server 401-*i*. If the next output of the packet is the VNF unit 411-*i-j* in the same server 401-*i*, the process proceeds to step S625 and if the next output of the packet is not the VNF unit 411-*i-j* in the same server 401-*i*, the process proceeds to step S629.

In step S625, the SFF unit 421-*i* transfers the packet to the VNF unit 411-*i-j* of the next output on the basis of the service index of the packet and the SFC relay table 461-*i*.

In step S626, the VNF units 411-*i-j* perform predetermined network service processing (for example, a firewall) on the packet.

In step S627, the VNF units 411-*i-j* decrement the service index of the packet by one.

In step S628, the VNF units 411-*i-j* output the packet to the SFF unit 421-*i*.

In step S629, the SFC mapper unit 431-*i* refers to the service index of the packet and the SFC relay table 461-*i*, and determines whether the next output of the packet is the other sub-domain. If the next output of the packet is the other sub-domain, the process proceeds to step S630 and if the next output of the packet is not the other sub-domain (specifically, if the next output of the packet is another server in the same sub-domain), the process proceeds to step S631.

In step S630, the SFC mapper unit 431-*i* resets the service index of the packet. Specifically, the SFC mapper unit 431-*i* changes the service index of the packet into a predetermined value (for example, 255, which is the initial value of the service index). The SFC relay table 461-*i* may furthermore include reset information indicating whether to reset the service index and the SFC mapper unit 431-*i* may reset the service index of the packet on the basis of the reset information. Suppose, for example, that the reset information corresponding to the output=the sub-domain B of the last line of the SFC relay table 461-1 illustrated in FIG. 5A is set to "reset=yes". In this case, when the packet is output to the sub-domain B, the SFC mapper unit 431 resets the service index of the packet. For example, the reset information indicating that the service index has been reset is set to the entry the output of which indicates the other sub-domain among the entries of the SFC relay table 461-*i*.

In step S631, the SFC mapper unit 431-*i* transmits the packet to the next output via the communication unit 441-*i*.

FIG. 16 illustrates the service index of the VNF before and after the change in the service chain according to the first embodiment.

The upper side of FIG. 16 illustrates the service chain before the change and the lower side of FIG. 16 illustrates the service chain after the change.

Before the change in the service chain, the service chain includes the VNF 1-1 of the sub-domain A and the VNF 2-1 of the sub-domain B. The packet is processed using each VNF in the order of the VNF 1-1 and the VNF 2-1. Furthermore, in the SFC relay table 461-1 of the sub-domain A, the service index corresponding to the VNF 1-1 is 255 and, in the SFC relay table 461-2 of the sub-domain B, the service index corresponding to the VNF 2-1 is 255. When the packet is output to the sub-domain B, the SFC mapper unit 431-1 in the sub-domain A changes (resets) the service index of the packet to 255. Because the service index of the received packet is 255, the SFF unit 422-2 in the sub-domain B transfers the packet to the VNF 2-1.

As illustrated at the lower side of FIG. 16, the VNF 1-2 is supposed to be added to the service chain in the sub-domain A. The packet is processed using each VNF in the order of the VNF 1-1, the VNF 1-2, and the VNF 2-1. The SFC relay table 461-1 is changed using the local SDN controller 301-1, and after the service chain in the sub-domain A is changed, the service index corresponding to the VNF 1-1 is 255 and the service index corresponding to the VNF 1-2 changes to 254 in the SFC relay table 461-1 of the sub-domain A. Furthermore, in the SFC relay table 461-2 of the sub-domain B, the service index corresponding to the VNF 2-1 is 255 and is not changed.

When the packet output from the VNF 1-2 is output to the sub-domain B, the SFC mapper unit 431-1 in the sub-domain A changes (resets) the service index of the packet to 255. Because the service index of the received packet is 255, the SFF unit 422-2 in the sub-domain B transfers the packet to the VNF 2-1.

As described above, in the system according to the first embodiment, even if the service chain in the sub-domain A is changed, the SFC relay table 461-2 of the sub-domain B is not changed.

In the system according to the first embodiment, even if the service chain in a certain sub-domain is changed, it is possible to eliminate the use of resetting of a plurality of sub-domains using a simple method. This process permits an operational efficiency to be maintained.

Figure 17:
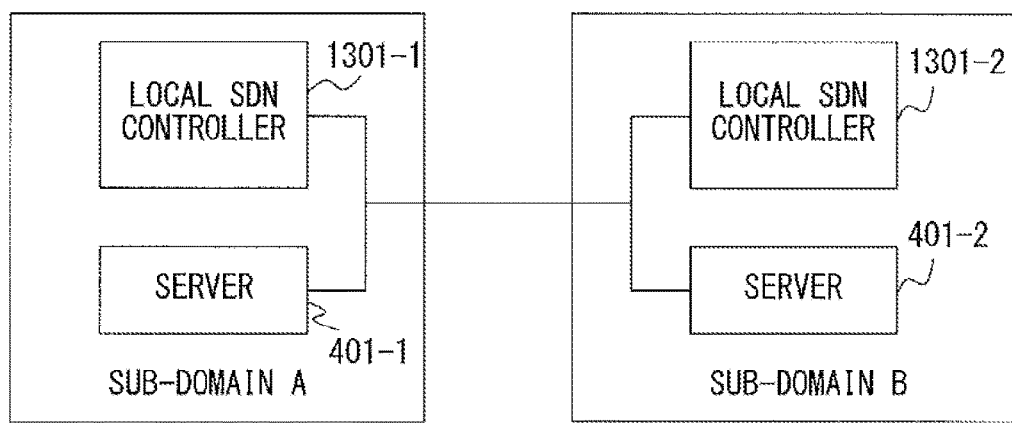
FIG. 17 illustrates a modification of a configuration diagram of the system according to the first embodiment.

FIG. 17 illustrates a modification of a configuration diagram of the system according to the first embodiment.

A system 1101 includes local SDN controllers 1301-$i$ (i=1, 2) and servers 401-$i$ (i=1, 2, 3).

The local SDN controllers 1301-$i$ and the servers 401-$i$ are connected to each other, respectively, via a network.

The local SDN controller 1301-1 and the server 401-1 belong to the sub-domain A. The local SDN controller 1301-2 and the server 401-2 belong to the sub-domain B.

The number of the servers 401-$i$ illustrated in FIG. 17 is expressed as one example and is not limited thereto.

Figure 18:
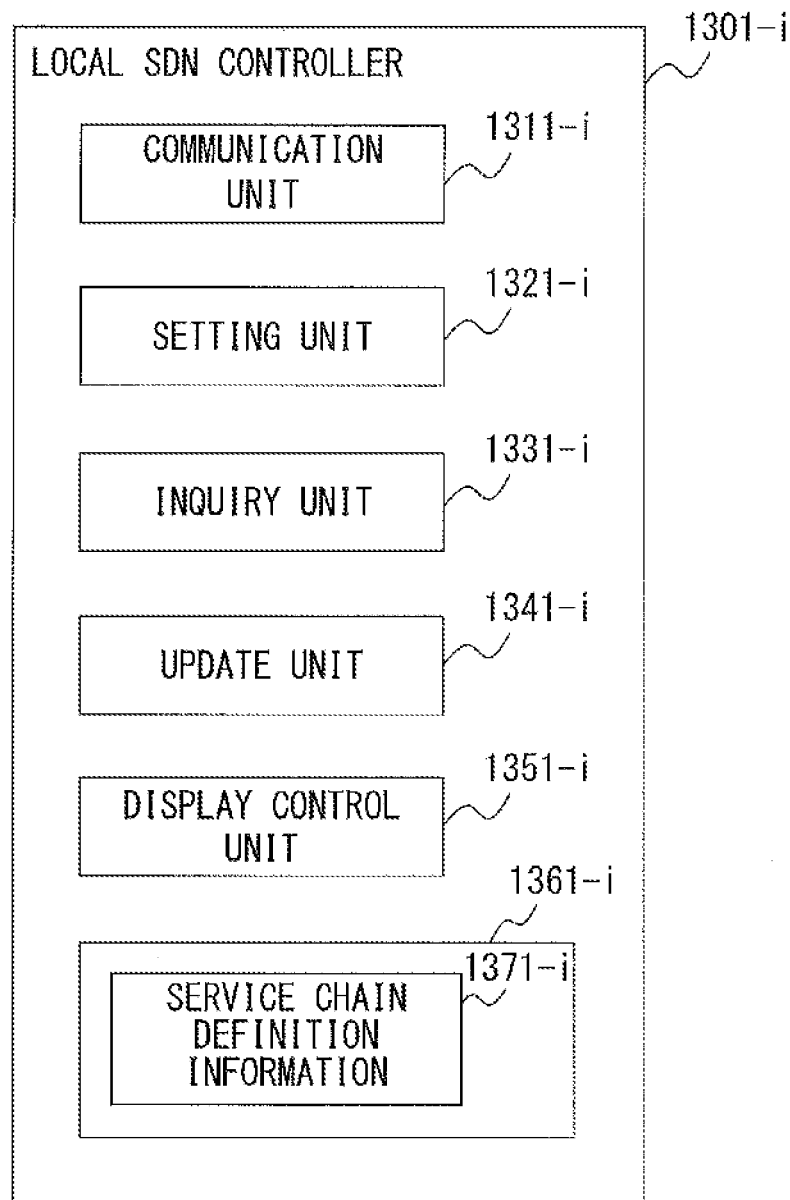
FIG. 18 is a configuration diagram of a local SDN controller of the modification.

FIG. 18 is a configuration diagram of the local SDN controller of the modification.

The local SDN controller 1301-$i$ includes a communication unit 1311-$i$, a setting unit 1321-$i$, an inquiry unit 1331-$i$, an update unit 1341-$i$, a display control unit 1351-$i$, and a memory unit 1361-$i$.

The communication unit 1311-$i$ communicates with the other local SDN controller 1301-$i$ and the server 401-$i$.

The setting unit 1321-$i$ sets the SFC relay table 461-$i$ of the server 401-$i$.

The inquiry unit 1331-$i$ inquires with the other local SDN controller 1301-$i$.

The update unit 1341-$i$ updates the service chain definition information 1371-$i$.

The display control unit 1351-$i$ controls a display of a display unit (not illustrated) such as a display etc. included in the local SDN controller 1301-$i$.

The memory unit 1361-$i$ is a memory device that stores data for use in the local SDN controller 1301-$i$. The memory unit 1361-$i$ stores the service chain definition information 1371-$i$. The service chain definition information 1371-$i$ is the same as the service chain definition information 341-$i$, and therefore descriptions will be omitted.

Figure 19A:
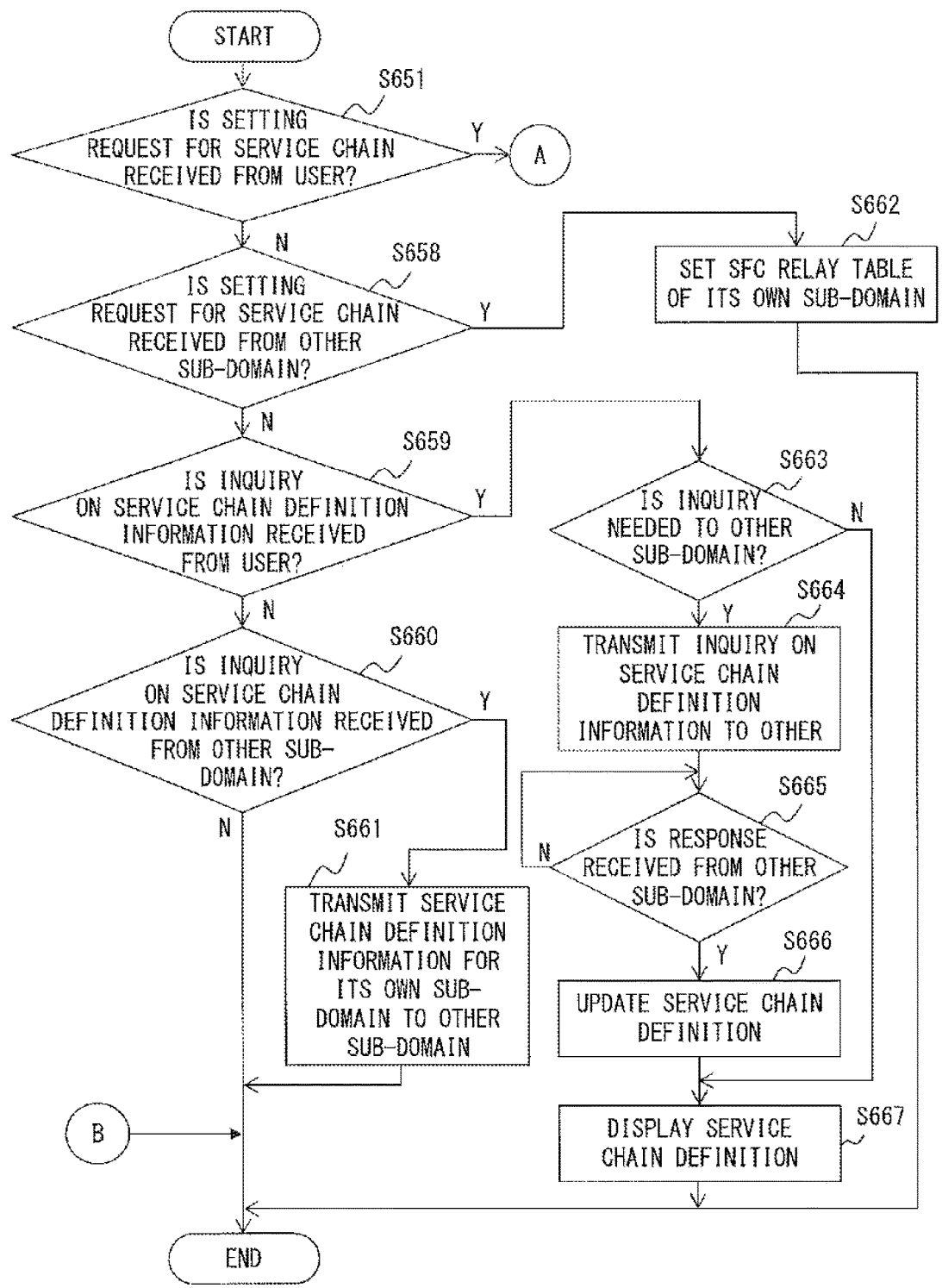
FIG. 19A illustrates a flowchart of service chain setting processing of the local SDN controller of the modification.
Figure 19B:
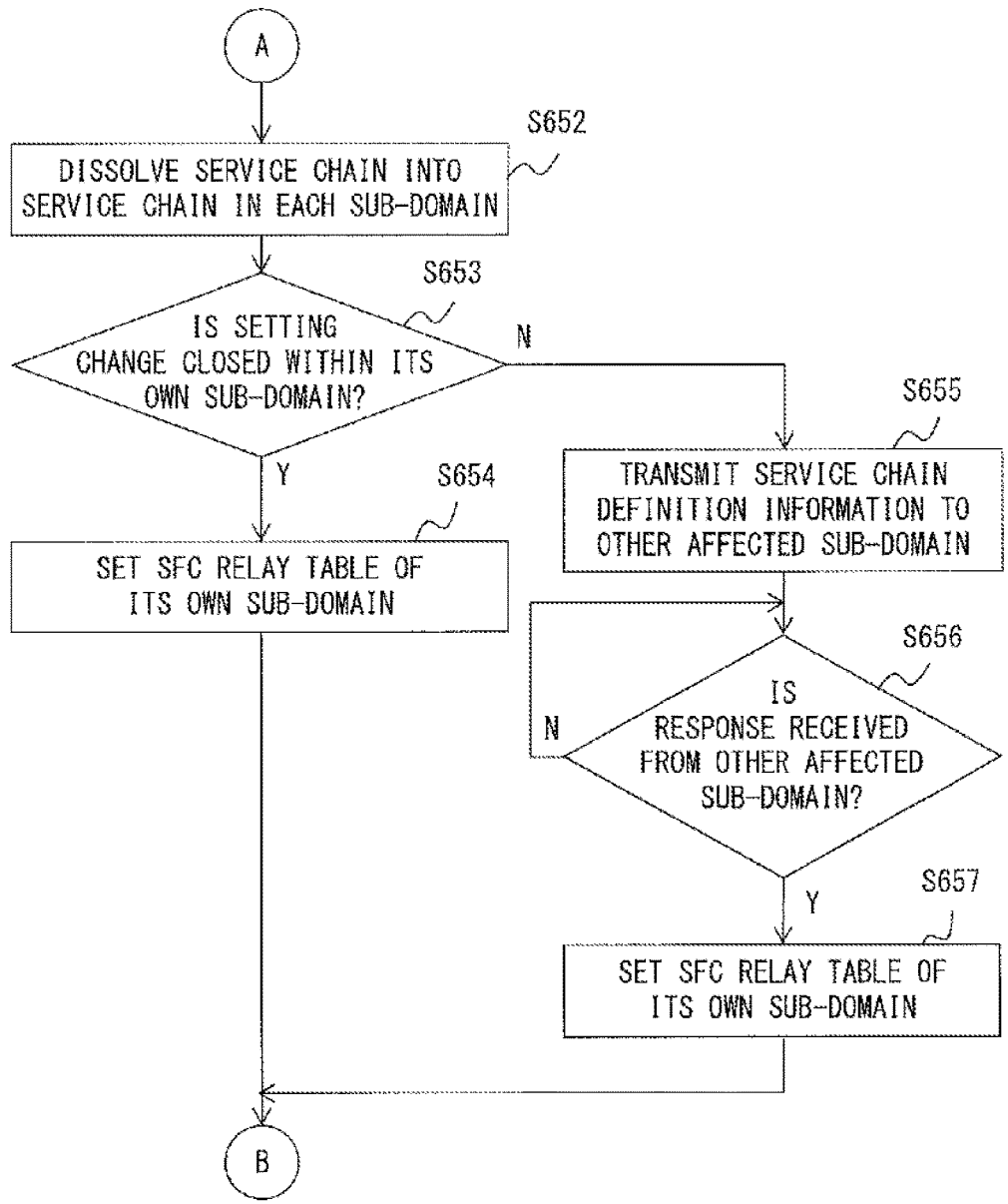
FIG. 19B illustrates a flowchart of the service chain setting processing of the local SDN controller of the modification.

FIGS. 19A and 19B illustrate a flowchart of service chain setting processing of the local SDN controller of the modification.

In step S651, the setting unit 1321-$i$ determines whether the setting request for the service chain has been received from a GUI etc. of the local SDN controller 1301-$i$. If the setting request for the service chain has been received, the process proceeds to step S652, and if the setting request for the service chain has not been received, the process proceeds to step S658. In the setting request for the service chain, the service chain definition information is included.

In step S652, the setting unit 1321-$i$ dissolves the service chain into the service chain in each sub-domain on the basis of the received service chain definition information. In the case of the service chain definition information illustrated in FIG. 9, the service chain is dissolved into the service chain (the VNF 1-1, the VNF 1-2, . . . , and the VNF 1-10) in the sub-domain A and the service chain (the VNF 2-1 and the VNF 2-2) in the sub-domain B.

In step S653, the setting unit 1321-$i$ determines whether the setting change is closed within its own sub-domain. Specifically, the setting unit 1321-$i$ compares the service chain definition information received this time and the current service chain definition information, and determines whether a changed portion of the service chain exists only in the sub-domain to which the setting unit 1321-$i$ belongs. If the changed portion is closed within its own sub-domain, the process proceeds to step S654, and if the changed portion is not closed within its own sub-domain, the process proceeds to step S655.

In step S654, the setting unit 1321-$i$ sets the SFC relay table 461-$i$ of the server 401-$i$ in its own sub-domain on the basis of the received service chain definition information.

In step S655, the setting unit 1321-$i$ transmits the received service chain definition information and service chain setting request to the other affected sub-domain (specifically, the other sub-domain in which the service chain is changed).

In step S656, if the setting unit 1321-$i$ receives a response from the other affected sub-domain, the process proceeds to step S657.

In step S657, the setting unit 1321-$i$ sets the SFC relay table 461-$i$ of the server 401-$i$ in its own sub-domain.

In step S658, the setting unit 1321-$i$ determines whether the service chain setting request has been received from the other sub-domain. If the service chain setting request has been received from the other sub-domain, the process proceeds to step S662, and if the service chain setting request has not been received from the other sub-domain, the process proceeds to step S659.

In step S659, the setting unit 1321-$i$ determines whether an inquiry on the service chain definition information has been received from a user. If the inquiry on the service chain definition information has been received from the user, the process proceeds to step S663, and if the inquiry on the service chain definition information has not been received from the user, the process proceeds to step S660.

In step S660, the setting unit 1321-$i$ determines whether the inquiry on the service chain definition information has been received from the local SDN controller 1301-$i$ in the other sub-domain. If the inquiry on the service chain definition information has been received from the local SDN controller 1301-$i$ in the other sub-domain, the process proceeds to step S661, and if the inquiry on the service chain definition information has not been received from the local SDN controller 1301-$i$ in the other sub-domain, the process ends.

In step S661, the inquiry unit 1331-$i$ transmits the service chain definition information for its own sub-domain included in the service chain definition information 1371-$i$ to the local SDN controller 1301-$i$ in the other sub-domain that is an inquiry source.

In step S662, the setting unit 1321-$i$ sets the SFC relay table 461-$i$ of the server 401-$i$ in its own sub-domain.

In step S663, the inquiry unit 1331-$i$ determines whether the service chain definition information needs to be inquired of the other sub-domain. If the service chain definition information needs to be inquired of the other sub-domain, the process proceeds to step S664, and if the service chain definition information does not need to be inquired of the other sub-domain, the process proceeds to step S667. When the inquiry on the service chain definition information from the user includes a request of the service chain definition information of the other sub-domain, the inquiry unit 1331-$i$ determines that the service chain definition information needs to be inquired of the other sub-domain.

In step S664, the inquiry unit 1331-$i$ transmits the inquiry on the service chain definition information to the local SDN controller 1301-$i$ in the other sub-domain.

In step S665, if the inquiry unit 1331-$i$ receives a response from the local SDN controller 1301-$i$ in the other sub-domain, the process proceeds to step S666.

In step S666, the update unit 1341-$i$ updates the service chain definition information 1371-$i$ on the basis of the response received from the local SDN controller 1301-$i$ in the other sub-domain.

In step S667, the display control unit 1351-$i$ displays the service chain definition information 1371-$i$.

Figure 20:
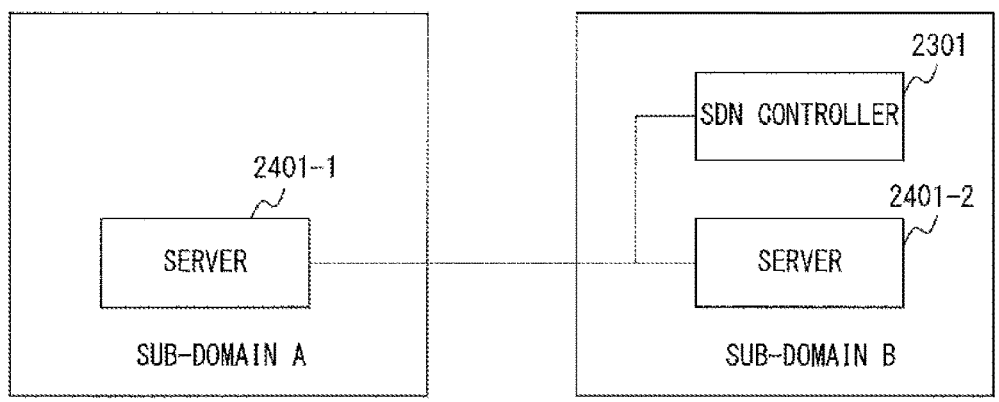
FIG. 20 is a configuration diagram of a system according to a second embodiment.

FIG. 20 is a configuration diagram of a system according to a second embodiment.

The system 2101 includes an SDN controller 2301 and servers 2401-$i$ ($i$=1, 2).

The SDN controller 2301 and the servers 2401-$i$ are connected to each other, respectively, via a network.

The server 2401-1 belongs to the sub-domain A. The SDN controller 2301 and the server 2401-2 belong to the sub-domain B. The sub-domain is called a group of devices determined by a manager.

The number of the servers 2401-$i$ illustrated in FIG. 20 is expressed as one example and is not limited thereto.

The SDN controller 2301 sets the service chain. Specifically, the SDN controller 2301 sets the SFC relay tables of the servers 2401-$i$.

The servers 2401-$i$ execute the service function of the network using software. Thereby, the service function (hereinafter, simply referred to as a service function) of the network is visualized on the servers 2401-$i$. Examples of the service function include a firewall, a router, a deep packet inspection (DPI), WAN acceleration, a service quality monitor, and the like.

Figure 21:
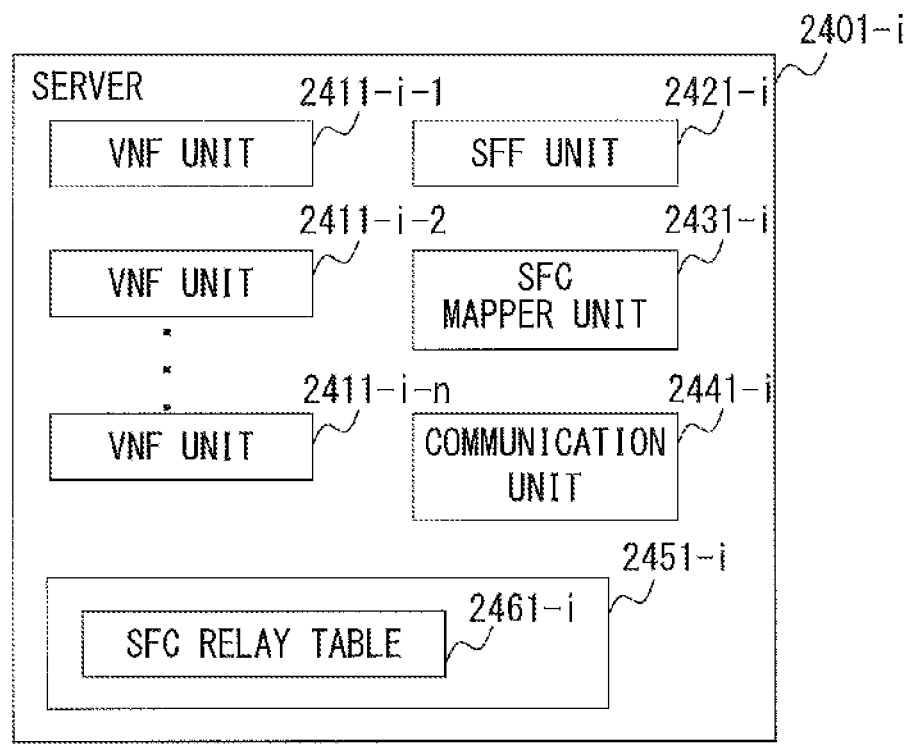
FIG. 21 is a configuration diagram of a server according to the second embodiment.

FIG. 21 is a configuration diagram of the server.

The server 2401-$i$ includes VNF units 2411-$i$-$j$ ($j$=1 to n), an SFF unit 2421-$i$, an SFC mapper unit 2431-$i$, a communication unit 2441-$i$, and a memory unit 2451-$i$.

The VNF units 2411-$i$-$j$, the SFF unit 2421-$i$, the SFC mapper unit 2431-$i$, and the communication unit 2441-$i$ have the same functions as those of the VNF units 411-$i$-$j$, the SFF unit 421-$i$, the SFC mapper unit 431-$i$, and the communication unit 441-$i$, respectively, and therefore descriptions will be omitted.

The memory unit 2451-$i$ is a memory device that stores data for use in the server 2401-$i$. The memory unit 2451-$i$ stores an SFC relay table 2461-$i$. The SFC relay table 2461-$i$ indicates the service chain (a combination of the VNF units 2411-$i$-$j$ applied to the packet) in the sub-domain to which the server 2401-$i$ belongs, and indicates outputs of the packet in the service chain.

FIGS. 22A and 22B illustrate examples of the SFC relay tables.

The SFC relay table 2461-1 illustrated in FIG. 22A is stored in the server 2401-1 in the sub-domain A and the SFC relay table 2461-2 illustrated in FIG. 22B is stored in the server 2401-2 in the sub-domain B.

The service path ID, the service index, the output, and the path ID are associated with each other and are described in the SFC relay table 2461-$i$.

The service path ID is information for identifying the service chain in its own sub-domain. The service path ID indicates a combination of the service functions to be performed on the packet in its own sub-domain.

The service index is information indicating the service functions and is information indicating the service function to be next applied to the packet. The service index indicates an order for performing the service functions. Furthermore, the service index indicates the service function, sub-domain, and device of the next output of the packet. In the second embodiment, an initial value of the service index is 255 and the service index is allocated to the VNF, decremented by one in the order of the VNFs to be transferred in each sub-domain. Suppose, for example, that the service chain definition information is information as illustrated in FIG. 9. In this case, in the sub-domain A, the packet is transferred and the various processes are performed in the order of the VNF 1-1, the VNF 1-2, . . . , and the VNF 1-10. Accordingly, as in the SFC relay table 2461-1 illustrated in FIG. 22A, the service index is 255 corresponding to the VNF 1-1=the output to which the packet is first transferred in the sub-domain A and the service index changes to 254 corresponding to the VNF 1-2=the output to which the packet is next transferred.

Furthermore, in the sub-domain B, the packet is transferred and the various processes are performed in the order of the VNF 2-1 and the VNF 2-2. Accordingly, as in the SFC relay table 2461-2 illustrated in FIG. 22B, the service index is 255 corresponding to the VNF 2-1=the output to which the packet is first transferred in the sub-domain B and the service index changes to 254 corresponding to the VNF 2-2=the output to which the packet is next transferred.

The output indicates an output of the packet. In the output, the service function (the VNF), the sub-domain, or the device is described.

The path ID indicates a value of the service path ID of the packet to be set at the time of outputting the packet. The path ID is information for identifying the service chain in the sub-domain of the output of the packet. The path ID indicates a correspondence relationship between the service chain in its own sub-domain and the service chain in the sub-domain of the output of the packet.

Suppose, for example, that the service chain is configured across the sub-domain A and the sub-domain B as illustrated in FIG. 10. In this case, the SFC relay table 2461-1 of the server 2401-1 in the sub-domain A is set to values as illustrated in FIG. 22A and the SFC relay table 2461-2 of the server 2401-2 in the sub-domain B is set to values as illustrated in FIG. 22B. The path ID is 200 corresponding to the sub-domain B=the output of the SFC relay table 2461-1 and the service path ID of each entry of the SFC relay table 2461-2 changes to 200. Therefore, it is understood that the service chain in the sub-domain A indicated in the SFC relay table 2461-1 is connected to the service chain in the sub-domain B indicated in the SFC relay table 2461-2. Furthermore, the service chain is configured across the sub-domain A and the sub-domain B as illustrated in FIG. 10.

When the packet is received, the SFF unit 2421-$i$ refers to the SFC relay table 2461-$i$, detects the output corresponding to the service path ID and service index included in the packet, and outputs the packet to the detected output.

Suppose, for example, that when the SFF unit 2421-1 receives the packet, the service path ID included in the received packet is 100 and the service index included in the received packet is 255. In this case, the output corresponding to the service path ID=100 and the service index=255 is the VNF 1-1 with reference to the SFC relay table 2461-1. Therefore, the SFF unit 2421-1 outputs the received packet to the VNF 1-1.

Suppose furthermore that when the SFF unit 2421-1 receives the packet, the service path ID included in the received packet is 100 and the service index included in the received packet is 245. In this case, with reference to the SFC relay table 2461-1, the output corresponding to the service path ID=100 and the service index=245 is the sub-domain B. Therefore, the SFF unit 2421-1 transfers the packet to the SFC mapper unit 2431-1 and the SFC mapper unit 2431-1 outputs the packet to the sub-domain B. At this time, the SFC mapper unit 2431-1 resets the service index of the packet, namely, updates the service index to 255. Also, the SFC mapper unit 2431-1 changes the service path ID of the packet from 100 to 200.

Suppose furthermore that when the SFF unit 2421-2 receives the packet, the service path ID included in the received packet is 200 and the service index included in the received packet is 255. In this case, with reference to the SFC relay table 2461-2, the output corresponding to the service path ID=200 and the service index=255 is the VNF 2-1. Therefore, the SFF unit 2421-2 outputs the received packet to the VNF 2-1.

Figure 23:
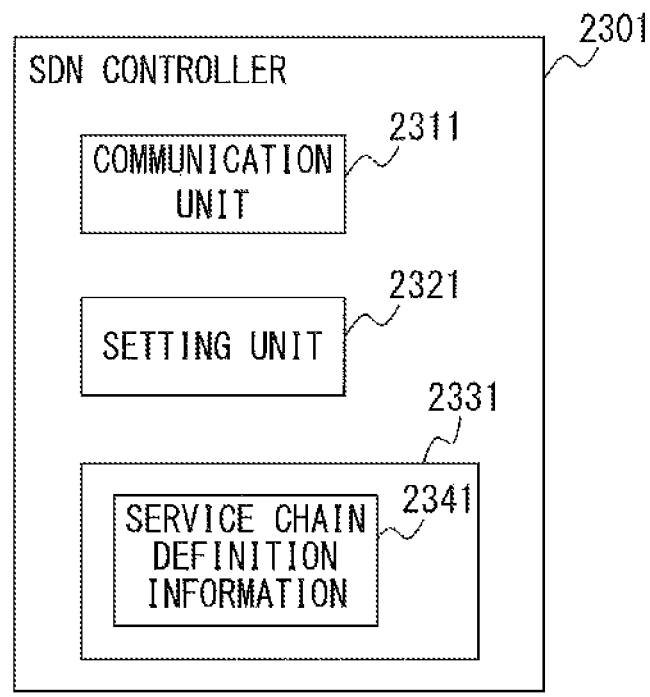
FIG. 23 is a configuration diagram of an SDN controller according to the second embodiment.

FIG. 23 is a configuration diagram of the SDN controller according to the second embodiment.

The SDN controller 2301 includes a communication unit 2311, a setting unit 2321, and a memory unit 2331.

The communication unit 2311 communicates with the servers 2401-i.

The setting unit 2321 sets the SFC relay tables 2461-i of the servers 2401-i.

The memory unit 2331 is a memory device that stores data for use in the SDN controller 2301. The memory unit 2331 stores the service chain definition information 2341. The service chain definition information 2341 is the same as the service chain definition information 341-i, and therefore descriptions will be omitted.

Figure 24:
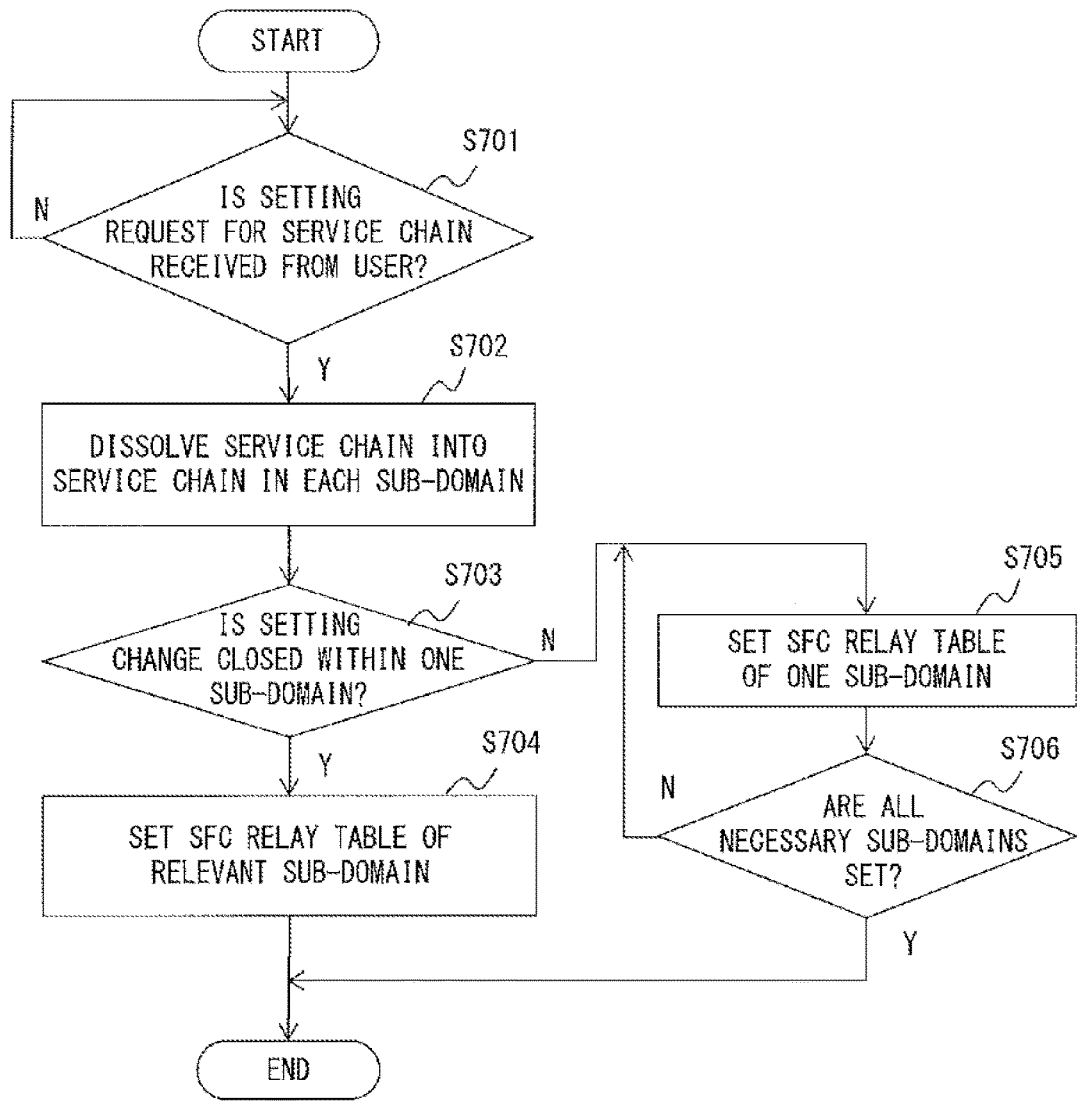
FIG. 24 is a flowchart of service chain setting processing according to the second embodiment.

FIG. 24 is a flowchart of service chain setting processing according to the second embodiment.

In step S701, if the setting unit 2321 receives a setting request for the service chain using a GUI etc. of the SDN controller 2301, the process proceeds to step S702. In the setting request for the service chain, the service chain definition information is included.

In step S702, the setting unit 2321 dissolves the service chain into the service chain in each sub-domain on the basis of the received service chain definition information. In the case of the service chain definition information illustrated in FIG. 9, the service chain is dissolved into the service chain (the VNF 1-1, the VNF 1-2, . . . , and the VNF 1-10) in the sub-domain A and the service chain (the VNF 2-1 and the VNF 2-2) in the sub-domain B.

In step S703, the setting unit 2321 determines whether the setting change is closed within one sub-domain. Specifically, the setting unit 2321 compares the service chain definition information received this time and the current service chain definition information, and determines whether a changed portion of the service chain exists only in the one sub-domain. If the setting change is closed within the one sub-domain, the process proceeds to step S704, and if the setting change is not closed within the one sub-domain, the process proceeds to step S705.

In step S704, the setting unit 2321 sets the SFC relay table 2461-i of the sub-domain in which the service chain is changed on the basis of the received service chain definition information.

In step S705, the setting unit 2321 sets the SFC relay table 2461-i of one sub-domain that has not yet been set in the sub-domain in which the service chain is changed on the basis of the received service chain definition information.

In step S706, if the setting unit 2321 sets the SFC relay tables 2461-i of all the sub-domains in which the service chain is changed, the process ends, and if the setting unit 2321 does not set the SFC relay tables 2461-i of all the sub-domains in which the service chain is changed, the process returns to step S705.

Figure 25:
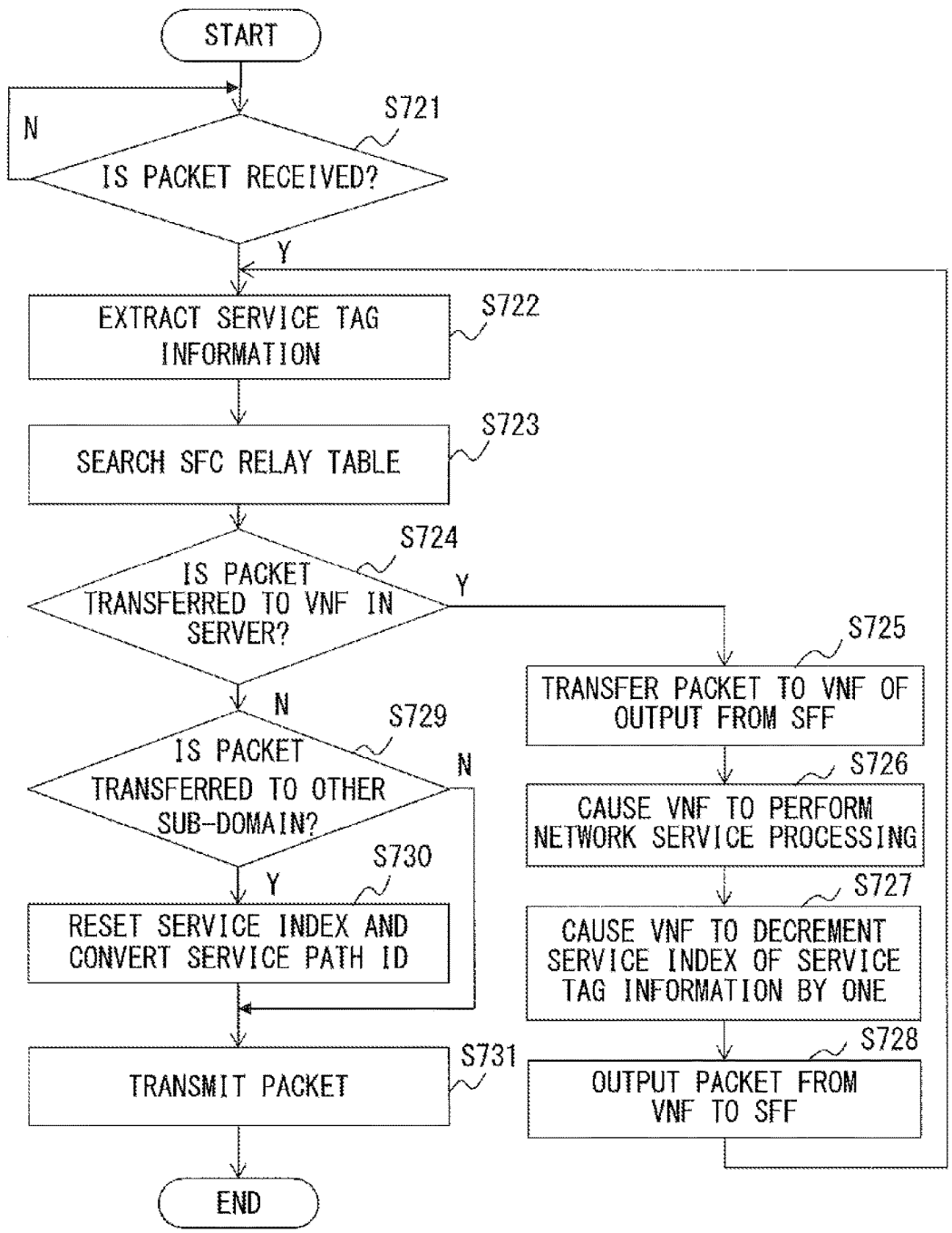
FIG. 25 is a flowchart illustrating packet relay processing of the server according to the second embodiment.

FIG. 25 is a flowchart illustrating the packet relay processing of the server according to the second embodiment.

In step S721, the communication unit 2441-i receives the packet.

In step S722, the SFF unit 2421-i extracts the service tag information of the packet. Specifically, the SFF unit 2421-i extracts the service path ID and service index of the packet.

In step S723, the SFF unit 2421-i searches the SFC relay table 461-i using as a search key the service path ID and service index of the packet, and detects the next output of the corresponding packet.

In step S724, on the basis of search results, the SFF unit 2421-i determines whether the next output of the packet is the VNF units 2411-i-j in the same server 2401-i. If the next output of the packet is the VNF units 2411-i-j in the same server 2401-i, the process proceeds to step S725 and if the next output of the packet is no the VNF units 2411-i-j in the same server 2401-i, the process proceeds to step S729.

In step S725, the SFF unit 2421-i transfers the packet to the VNF unit 2411-i-j of the next output on the basis of the service index of the packet and the SFC relay table 2461-i.

In step S726, the VNF unit 2411-i-j performs predetermined network service processing (for example, a firewall) to the packet.

In step S727, the VNF unit 2411-i-j decrements the service index of the packet by one.

In step S728, the VNF unit 2411-i-j outputs the packet to the SFF unit 2421-i.

In step S729, the SFC mapper unit 2431-i refers to the service index of the packet and the SFC relay table 2461-i, and determines whether the next output of the packet is the other sub-domain. If the next output of the packet is the other sub-domain, the process proceeds to step S730, and if the next output of the packet is not the other sub-domain (if the next output of the packet is the other server in the same sub-domain), the process proceeds to step S731.

In step S730, the SFC mapper unit 2431-i resets the service index of the packet. Specifically, the SFC mapper unit 2431-i changes the service index of the packet into a predetermined value (for example, 255, which is the initial value of the service index). Furthermore, the SFC mapper unit 2431-i changes the service path ID of the packet into a value of the path ID corresponding to the next output of the packet described in the SFC relay table 2461-i. For example, when the packet is output to the sub-domain B, the SFC mapper unit 2431-i changes the service path ID of the packet into a value (=200) of the path ID corresponding to the sub-domain B=the output of the SFC mapper unit 2431-i of FIG. 22A.

In step S731, the SFC mapper unit 2431-i transmits the packet to the next output via the communication unit 2441-i.

Figure 26:
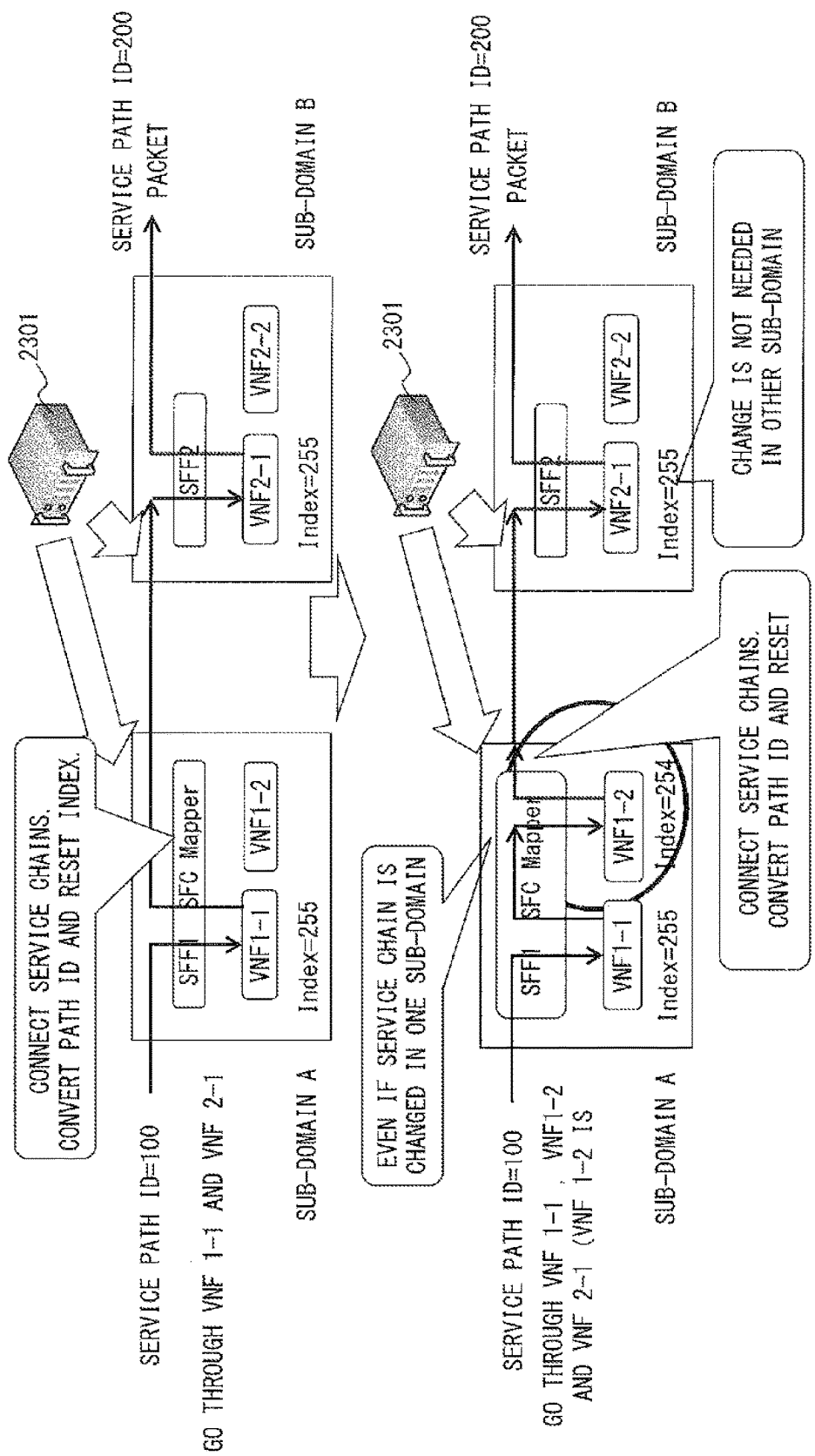
FIG. 26 illustrates a service index of a VNF before and after a change in the service chain according to the second embodiment.

FIG. 26 illustrates the service index of the VNFs before and after the change in the service chain according to the second embodiment.

The upper side of FIG. 26 illustrates the service chain before the change and the lower side of FIG. 26 illustrates the service chain after the change.

Before the change in the service chain, the service chain includes the VNF 1-1 of the sub-domain A and the VNF 2-1 of the sub-domain B. The packet is processed using each VNF in the order of the VNF 1-1 and the VNF 2-1. Furthermore, in the SFC relay table 2461-1 of the sub-domain A, the service index corresponding to the VNF 1-1 is 255, and in the SFC relay table 2461-2 of the sub-domain B, the service index corresponding to the VNF 2-1 is 255. When the packet is output to the sub-domain B, the SFC mapper unit 2431-1 in the sub-domain A changes the service path ID of the packet to 200 and changes (resets) the service index of the packet to 255. Because the service index of the received packet is 255, the SFF unit 422-2 in the sub-domain B transfers the packet to the VNF 2-1.

As illustrated at the lower side of FIG. 26, the VNF 1-2 is supposed to be added to the service chain in the sub-domain A. The packet is processed using each VNF in the order of the VNF 1-1, the VNF 1-2, and the VNF 2-1. The SFC relay table 2461-1 is changed using the SDN controller 2301 and, after the change in the service chain in the sub-domain A in the SFC relay table 2461-1 of the sub-domain A, the service index corresponding to the VNF 1-1 is 255 and the service index corresponding to the VNF 1-2 changes to 254. Furthermore, in the SFC relay table 2461-2 of the sub-domain B, the service index corresponding to the VNF 2-1 is 255 and is not changed.

When the packet output from the VNF 1-2 is output to the sub-domain B, the SFC mapper unit 2431-1 in the sub-domain A changes the service path ID of the packet to 200 and changes (resets) the service index of the packet to 255. Because the service index of the received packet is 255, the SFF unit 422-2 in the sub-domain B transfers the packet to the VNF 2-1.

As described above, in the system according to the second embodiment, even if the service chain in the sub-domain A is changed, the SFC relay table 2461-2 of the sub-domain B is not changed.

In the system according to the second embodiment, even if the service chain in a certain sub-domain is changed, it is possible to eliminate the use of resetting of a plurality of sub-domains using a simple method. This process permits an operational efficiency to be maintained. In the system according to the second embodiment, by converting the service path ID, different service path IDs can be connected between the sub-domains and the service chain can be configured.

Furthermore, in response to a load state, a line state of a transmission destination of the packet, or conditions of terminal performance, the SFC mapper unit 2431-*i* may select the transmission destination. The server 2401-*i* may regularly collect information on the load state, the line state, the terminal performance, etc. or may receive the information from the other server 2401-*i* or the SDN controller 2301.

FIG. 27 illustrates a modification of the SFC relay table according to the second embodiment.

For example, the SFC relay table 2461-1 may be configured using SFC relay tables 2461-1-A and 2461-1-B as illustrated in FIG. 27. The SFC relay tables 2461-1-A and 2461-1-B are stored in the server 2401-1 in the sub-domain A.

The service path ID, the service index, and the output are associated with each other and are described in the SFC relay table 2461-1-A.

The service path ID is information for identifying the service chain. The service path ID indicates a combination of the service functions to be performed on the packet.

The service index is information indicating the service function and is information indicating the service function to be next applied to the packet. The service index indicates an order for performing the service function. Also, the service index indicates the service function, sub-domain, or device of the next output of the packet.

The output indicates an output of the packet. In the output, the service function (VNF) and a group of the sub-domain are described.

The service path ID, the service index, and the output are associated with each other and are described in the SFC relay table 2461-1-A.

The group, the sub-domain, the path ID, and the conditions are associated with each other and are described in the SFC relay table 2461-1-B.

The group indicates a group of the sub-domain.

The sub-domain indicates a sub-domain of the output.

The path ID indicates a value of the service path ID of the packet to be set at the time of outputting the packet. The path ID is information for identifying the service chain in the sub-domain of the output of the packet. The path ID indicates a correspondence relationship between the service chain in its own sub-domain and the service chain in the sub-domain of the output of the packet.

The conditions are conditions for use in the selection of the output of the packet. As the conditions, for example, the conditions are described based on the load state, the line state of the output of the packet, or the terminal performance. "The load is equal to or less than 50%" is described, for example, in the conditions corresponding to the sub-domain B of the SFC relay table 2461-1-B. This indicates that when the load of the server in the sub-domain B is equal to or less than 50%, the sub-domain B is selected as the output.

When the packet is received, the SFF unit 2421-1 refers to the SFC relay tables 2461-1-A and 2461-1-B, detects the output corresponding to the service path ID and service index included in the packet, and outputs the packet to the detected output.

Suppose, for example, that when the SFF unit 2421-1 receives the packet, the service path ID included in the received packet is 100 and the service index included in the received packet is 255. In this case, referring to the SFC relay table 2461-1-A, the output corresponding to the service path ID=100 and the service index=245 is the VNF 1-1. Therefore, the SFF unit 2421-1 outputs the received packet to the VNF 1-1.

Suppose furthermore that when the SFF unit 2421-1 receives the packet, the service path ID included in the received packet is 100 and the service index included in the received packet is 245. In this case, referring to the SFC relay table 2461-1-A, the output corresponding to the service path ID=100 and the service index=245 is the sub-domain group 1. Next, the SFC mapper unit 2431-1 refers to the SFC relay table 2461-1-B, detects the entry corresponding to the group 1, detects the sub-domain relevant to the conditions in the entry, and outputs the packet to the detected sub-domain. For example, when the load of the server in the sub-domain B is equal to or less than 50%, the SFC mapper unit 2431-1 outputs the packet to the sub-domain B. At this time, the SFC mapper unit 2431-1 resets the service index of the packet, namely, updates the service index to 255. Also, the SFC mapper unit 2431-1 changes the service path ID of the packet from 100 to 200.

Figure 28:
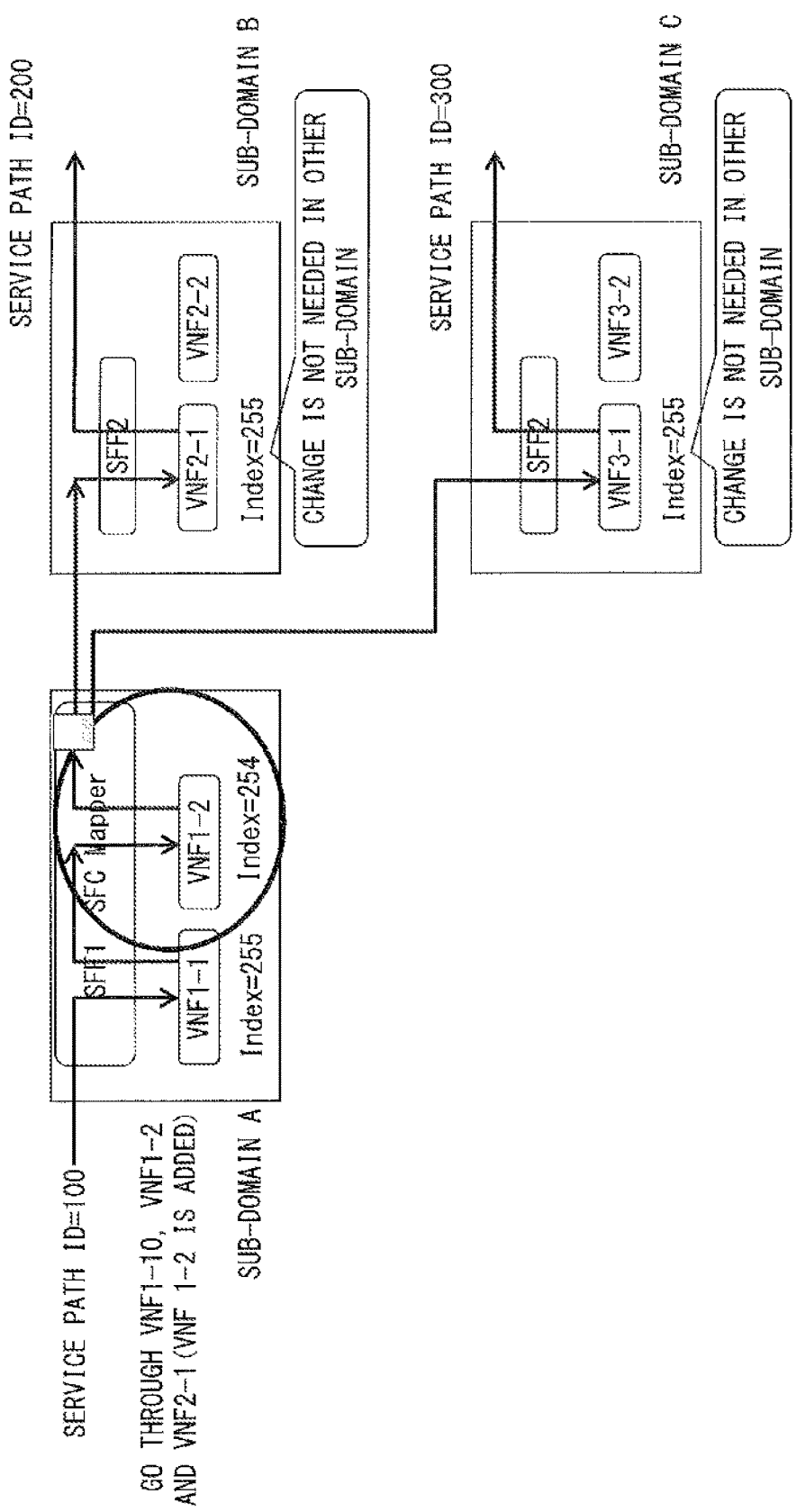
FIG. 28 illustrates the modification of the packet relay processing and the service index of the VNF according to the second embodiment.

FIG. 28 illustrates the modification of the packet relay processing and the service index of the VNF according to the second embodiment.

FIG. 28 illustrates the case of adding the VNF 1-2 to the service chain in the sub-domain A.

Before the change in the service chain, the service chain includes the VNF 1-1 of the sub-domain A and the VNF 2-1 of the sub-domain B. The packet is processed using each VNF in the order of the VNF 1-1 and the VNF 2-1 or in the order of the VNF 1-1 and the VNF 1-3. In the SFC relay table of the sub-domain A, the service index corresponding to the VNF 1-1 is 255, and in the SFC relay table of the sub-domain B, the service index corresponding to the VNF 2-1 is 255. Furthermore, in the SFC relay table of the sub-domain C, the service index corresponding to the VNF 3-1 is 255.

Before the change in the service chain, the SFC mapper unit in the sub-domain A outputs the packet output from the VNF 1-1 to either the sub-domain B or the sub-domain C in accordance with the conditions. When the packet is output to the sub-domain B, the SFC mapper unit 2431-1 in the sub-domain A changes the service path ID of the packet to 200 and changes (resets) the service index of the packet to 255. Because the service index of the received packet is 255, the SFF unit in the sub-domain B transfers the packet to the VNF 2-1. When the packet is output to the sub-domain C, the SFC mapper unit 2431-1 in the sub-domain A changes the service path ID of the packet to 300 and changes (resets) the service index of the packet to 255. Because the service index of the received packet is 255, the SFF unit in the sub-domain C transfers the packet to the VNF 3-1.

As illustrated in FIG. 28, the VNF 1-2 is supposed to be added to the service chain in the sub-domain A. The packet is processed using each VNF in the order of the VNF 1-1, the VNF 1-2, and the VNF 2-1 or in the order of the VNF 1-1, the VNF 1-2, and the VNF 3-1. After the change in the service chain in the sub-domain A, in the SFC relay table of the sub-domain A, the service index corresponding to the VNF 1-1 is 255 and the service index corresponding to the VNF 1-2 changes to 254. Furthermore, in the SFC relay table of the sub-domain B, the service index corresponding to the VNF 2-1 is 255 and is not changed. Furthermore, in the SFC relay table of the sub-domain C, the service index corresponding to the VNF 3-1 is 255 and is not changed.

The SFC mapper unit in the sub-domain A outputs the packet output from the VNF 1-2 to either the sub-domain B or the sub-domain C in accordance with the conditions. When the packet output from the VNF 1-2 is output to the sub-domain B, the SFC mapper unit in the sub-domain A changes the service path ID of the packet to 200 and changes (resets) the service index of the packet to 255. Because the service index of the received packet is 255, the SFF unit 422-2 in the sub-domain B transfers the packet to the VNF 2-1. When the packet output from the VNF 1-2 is output to the sub-domain C, the SFC mapper unit in the sub-domain A changes the service path ID of the packet to 300 and changes (resets) the service index of the packet to 255. Because the service index of the received packet is 255, the SFF unit 422-2 in the sub-domain C transfers the packet to the VNF 2-1.

As described above, even if the service chain in the sub-domain A is changed, the SFC relay tables of the sub-domain B and the sub-domain C are not changed. In the modification of the packet relay processing according to the second embodiment, the sub-domain of the output of the packet can be selected in response to the conditions of the load state, the line state, the terminal performance, or the like.

Figure 29:
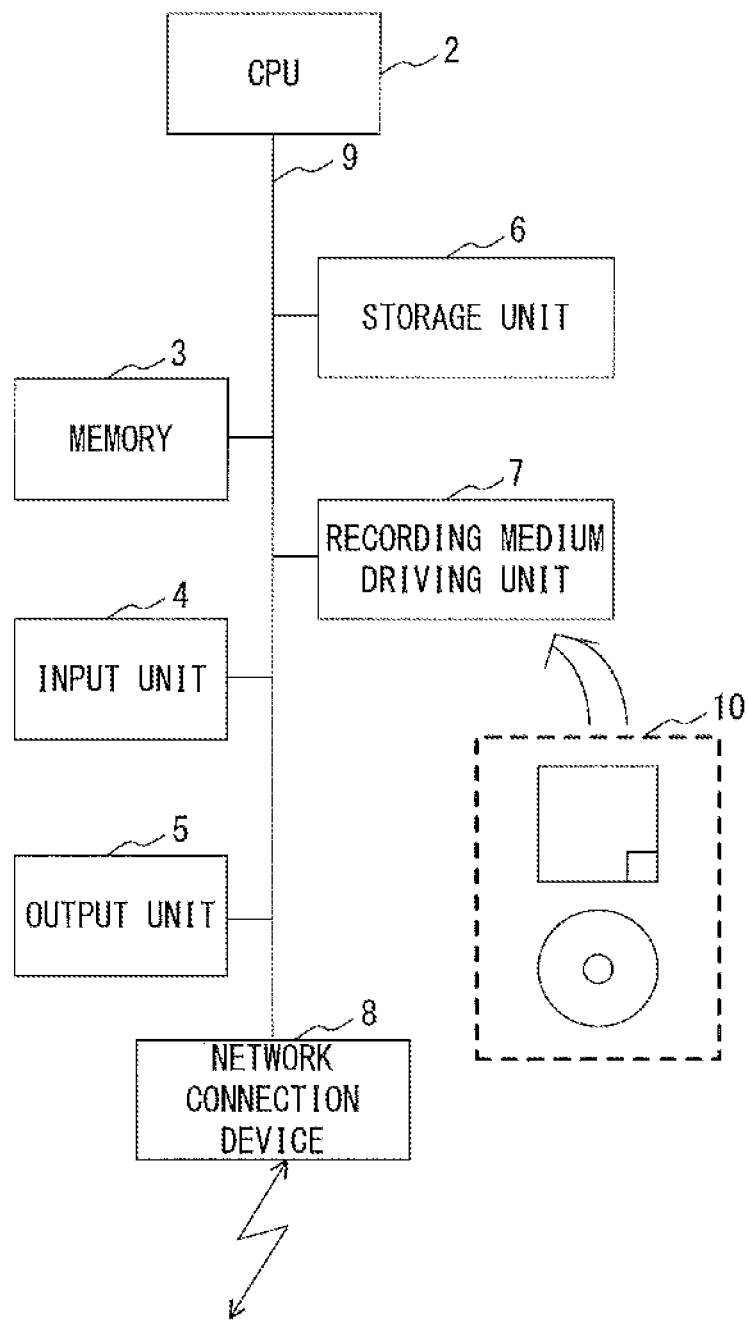
FIG. 29 is a configuration diagram illustrating an information processing device (computer).

FIG. 29 is a configuration diagram illustrating an information processing device (computer).

The SDN controllers 201, 301-*i*, 1301-*i*, and 2301 and the servers 401-*i* and 2401-*i* of the embodiments can be implemented, for example, using the information processor (computer) 1 as illustrated in FIG. 29.

The information processing device 1 includes a Central Processing Unit (CPU) 2, a memory 3, an input unit 4, an output unit 5, a storage unit 6, a recording medium driving unit 7, and a network connection device 8, and they are connected to each other via a bus 9.

The CPU 2 is a central processor that controls the entire information processing device 1. The CPU 2 performs as the VNF units 411-*i*-*j* and 2411-*i*-*j*, the SFF units 431-*i* and 2431-*i*, or the SFC mapper units 431-*i* and 2431-*i*. Also, the CPU 2 acts as the request unit 221, the setting units 321-*i*, 1321-*i*, and 2321-*i*, the inquiry unit 1331-*i*, the update unit 1341-*i*, or the display control unit 1351-*i*.

When a program is executed, the memory 3 is a memory such as a read-only memory (ROM), a random access memory (RAM), etc. that temporarily stores programs or data stored in the storage unit 6 (or a portable recording medium 10). By executing programs using the memory 3, the CPU 2 performs the above-described various processes.

In this case, a program code itself read out from the portable recording medium 10 etc. implements functions of the embodiments.

The input device 4 is used for an input of an instruction or information from the user or operator, an acquisition of data for use in the information processing device 1, or the like. Examples of the input unit 4 include a keyboard, a mouse, a touch panel, a camera, and the like.

The output unit 5 is a unit that outputs an inquiry or processing results to the user or operator, or operates under the control of the CPU 2. Examples of the output unit 5 include a display, a printer, and the like.

Examples of the storage unit 6 include a magnetic disk device, an optical disk device, a tape device, and the like. The information processing device 1 stores the above-described programs and data in the storage unit 6 and reads them out from the storage unit 6 to the memory 3 for use. The memory 3 or the storage unit 6 corresponds to the memory units 231, 331-*i*, 451-*i*, 1361-*i*, 2331, and 2451-*i*.

The recording medium driving unit 7 drives the portable recording medium 10 and accesses recording contents thereof. As the portable recording medium, any computer-readable recording medium can be used such as a memory card, a flexible disk, a compact disk read only memory (CD-ROM), an optical disk, a magnetic optical disk, etc. The user stores the above-described programs and data in this portable recording medium 10 and reads them out to the memory 3 for use.

The network connection device 8 is a communication interface that can be connected to any communication network such as a local area network (LAN), a wide area network (WAN), etc. and that performs data conversion accompanied by communication. The network connection device 8 transmits data to a device to which it is connected via the communication network or receives data from a device to which it is connected via the communication network. The network connection device 8 corresponds to the communication units 211, 311-*i*, 441-*i*, 1311-*i*, and 2441-*i*.

All examples and conditional language provided herein are intended for pedagogical purposes to aiding the reader in understanding the invention and the concepts contributed by the inventor to furthermore the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory storage medium having stored therein a packet relay program for relaying a packet in a first sub-domain among a plurality of sub-domains in a service chain configured across the plurality of sub-domains, the packet relay program when executed by a computer in the first sub-domain to perform a process, the process comprising:

controlling a receiver so as to receive the packet including identification information indicating a combination of a plurality of service functions included in the service chain and an index indicating an order for applying the service function, the index being a predetermined value;

specifying a next transmission destination corresponding to the identification information included in the packet and the index included in the packet on a basis of relay information with which identification information indicating a combination of a plurality of service functions included in the service chain, an index indicating an order for applying the service function, and the next transmission destination are associated;

when the specified next transmission destination is a service function in the first sub-domain, applying, to the packet, a service function in the first sub-domain that corresponds to the specified next transmission destination, and decrementing the index by one;

changing the index included in the packet into the predetermined value when the specified next transmission destination is a second sub-domain among the plurality of sub-domains; and controlling a transmitter so as to transmit the packet including the identification information included in the packet and the index of the predetermined value to the specified next transmission destination.

2. A non-transitory storage medium having stored therein a packet relay program for relaying a packet in a first sub-domain among a plurality of sub-domains in a service chain configured across the plurality of sub-domains, the packet relay program executed by a computer in the first sub-domain to perform a process, the process comprising:

controlling a receiver so as to receive the packet including identification information indicating a combination of a plurality of service functions included in the service chain and an index indicating an order for applying the service function, the index being a predetermined value;

specifying a next transmission destination corresponding to the identification information included in the packet and the index included in the packet on a basis of relay information with which identification information indicating a combination of a plurality of service functions included in the service chain in the first sub-domain, an index indicating an order for applying the service function, the next transmission destination, and identification information in the next transmission destination are associated;

when the specified next transmission destination is a service function in the first sub-domain, applying, to the packet, a service function in the first sub-domain that corresponds to the specified next transmission destination, and decrementing the index by one;

changing the index included in the packet into the predetermined value and changing the identification information included in the packet into an identification information in the specified next transmission destination when the specified next transmission destination is a second sub-domain among the plurality of sub-domains; and controlling a transmitter so as to transmit the packet including the identification information in the specified next transmission destination and the index of the predetermined value to the specified next transmission destination.

3. A packet relay method for relaying a packet in a first sub-domain among a plurality of sub-domains in a service chain configured across the plurality of sub-domains, the packet relay method causing a computer to perform a process, the packet relay method comprising:

receiving, by a receiver, the packet including identification information indicating a combination of a plurality of service functions included in the service chain and an index indicating an order for applying the service function, the index being a predetermined value;

specifying, by a processor, a next transmission destination corresponding to the identification information included in the packet and the index included in the packet on a basis of relay information with which identification information indicating a combination of a plurality of service functions included in the service chain, an index indicating an order for applying the service function, and the next transmission destination are associated;

when the specified next transmission destination is a service function in the first sub-domain, applying, by the processor, to the packet, a service function in the first sub-domain that corresponds to the specified next transmission destination, and decrementing, by the processor, the index by one;

changing, by the processor, the index included in the packet into the predetermined value when the specified next transmission destination is a second sub-domain among the plurality of sub-domains; and transmitting, by a transmitter, the packet including the identification information included in the packet and the index of the predetermined value to the specified next transmission destination.

4. A packet relay method of relaying a packet in a first sub-domain among a plurality of sub-domains in a service chain configured across the plurality of sub-domains, the packet relay method causing a computer to perform a process, the packet relay method comprising:

receiving, by a receiver, the packet including identification information indicating a combination of a plurality of service functions included in the service chain and an index indicating an order for applying the service function, the index being a predetermined value;

specifying, by a processor, a next transmission destination of the packet corresponding to the identification information included in the packet and the index included in the packet on a basis of relay information stored in a storage with which identification information indicating a combination of a plurality of service functions included in the service chain in the first sub-domain, an index indicating an order for applying the service function, the next transmission destination, and identification information in the next transmission destination are associated;

when the specified next transmission destination is a service function in the first sub-domain, applying, by the processor, to the packet, a service function in the first sub-domain that corresponds to the specified next transmission destination, and decrementing, by the processor, the index by one;

changing, by the processor, the index included in the packet into the predetermined value and changing the identification information included in the packet into an identification information in the specified next transmission destination when the specified next transmission destination is a second sub-domain among the plurality of sub-domains; and transmitting, by a transmitter, the packet including the identification information in the specified next transmission destination and the index of the predetermined value to the specified next transmission destination.

* * * * *